United States Patent
Rodriguez et al.

(10) Patent No.: US 12,513,390 B2
(45) Date of Patent: Dec. 30, 2025

(54) VIRTUAL AND AUGMENTED REALITY SYSTEMS AND METHODS USING DISPLAY SYSTEM CONTROL INFORMATION EMBEDDED IN IMAGE DATA

(71) Applicant: Magic Leap, Inc., Plantation, FL (US)

(72) Inventors: Jose Felix Rodriguez, Hialeah, FL (US); Ricardo Martinez Perez, Plantation, FL (US); Reza Nourai, Danville, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 18/971,685

(22) Filed: Dec. 6, 2024

(65) Prior Publication Data
US 2025/0106503 A1 Mar. 27, 2025

Related U.S. Application Data

(63) Continuation of application No. 18/462,891, filed on Sep. 7, 2023, now Pat. No. 12,200,356, which is a
(Continued)

(51) Int. Cl.
*H04N 23/65* (2023.01)
*G02B 27/01* (2006.01)
(Continued)

(52) U.S. Cl.
CPC ......... *H04N 23/65* (2023.01); *G02B 27/0101* (2013.01); *G02B 27/0172* (2013.01);
(Continued)

(58) Field of Classification Search
CPC ................................. G02B 27/0101
See application file for complete search history.

(56) References Cited

U.S. PATENT DOCUMENTS 6,084,979 A 7/2000 Kanade et al.
6,351,261 B1 2/2002 Reichlen et al.
(Continued)

FOREIGN PATENT DOCUMENTS

JP H08292394 A 11/1996
JP 2005173473 A 6/2005
(Continued)

OTHER PUBLICATIONS

ARToolKit: https://web.archive.org/web/20051013062315/http://www.hitl.washington.edu:80/artoolkit/documentation/hardware.htm, archived Oct. 13, 2005.
(Continued)

*Primary Examiner* — Gustavo Polo
(74) *Attorney, Agent, or Firm* — Tobias Intellectual Property Law, PLLC

(57) ABSTRACT

A display system, such as a virtual reality or augmented reality display system, can control a display to present image data including a plurality of color components, on a plurality of depth planes supported by the display. The presentation of the image data through the display can be controlled based on control information that is embedded in the image data, for example to indicate an active or inactive color component and/or depth plane. In some examples, light sources and/or spatial light modulators that relay illumination from the light sources may receive signals from a display controller to adjust a power setting to the light source or spatial light modulator based on control information embedded in an image data frame.

22 Claims, 17 Drawing Sheets

Related U.S. Application Data continuation of application No. 17/961,462, filed on Oct. 6, 2022, now Pat. No. 11,800,218, which is a continuation of application No. 16/902,820, filed on Jun. 16, 2020, now Pat. No. 11,616,911, which is a continuation of application No. 15/902,710, filed on Feb. 22, 2018, now Pat. No. 10,735,649.

(51) Int. Cl.
 G02B 27/10 (2006.01)
 G06T 19/00 (2011.01)
(52) U.S. Cl.
 CPC ........ *G02B 27/1046* (2013.01); *G06T 19/006* (2013.01); *G02B 2027/0112* (2013.01); *G02B 2027/0127* (2013.01); *G02B 2027/014* (2013.01)

(56) References Cited

U.S. PATENT DOCUMENTS

| | | | |
|---|---|---|---|
| 6,377,276 B1 | 4/2002 | Ludtke | |
| 6,421,475 B1 | 7/2002 | Engelhardt et al. | |
| 6,850,221 B1 | 2/2005 | Tickle | |
| 7,522,257 B2 | 4/2009 | Jacobs et al. | |
| 8,950,867 B2 | 2/2015 | Macnamara | |
| 9,036,078 B1 | 5/2015 | D Amico et al. | |
| 9,081,426 B2 | 7/2015 | Armstrong | |
| 9,240,069 B1 | 1/2016 | Li | |
| 9,310,559 B2 | 4/2016 | Macnamara | |
| 9,348,143 B2 | 5/2016 | Gao et al. | |
| D758,367 S | 6/2016 | Natsume | |
| 9,547,174 B2 | 1/2017 | Gao et al. | |
| 9,851,563 B2 | 12/2017 | Gao et al. | |
| 9,857,591 B2 | 1/2018 | Welch et al. | |
| 10,684,475 B2 | 6/2020 | Oto et al. | |
| 10,735,649 B2 | 8/2020 | Rodriguez et al. | |
| 11,302,018 B2 | 4/2022 | Rodriguez et al. | |
| 11,616,911 B2 | 3/2023 | Rodriguez et al. | |
| 11,800,218 B2 | 10/2023 | Rodriguez et al. | |
| 2002/0000994 A1 | 1/2002 | Bergstrom et al. | |
| 2002/0057280 A1 | 5/2002 | Anabuki et al. | |
| 2004/0240708 A1 | 12/2004 | Hu et al. | |
| 2006/0187298 A1 | 8/2006 | Jacobs | |
| 2008/0043203 A1 | 2/2008 | Jacobs et al. | |
| 2008/0153503 A1 | 6/2008 | Birla et al. | |
| 2008/0297437 A1 | 12/2008 | Takahashi | |
| 2010/0165081 A1 | 7/2010 | Jung et al. | |
| 2011/0018903 A1 | 1/2011 | Lapstun et al. | |
| 2011/0080461 A1 | 4/2011 | Ishikawa et al. | |
| 2011/0164121 A1 | 7/2011 | Ikeda et al. | |
| 2011/0169823 A1 | 7/2011 | Barenburg et al. | |
| 2011/0175902 A1 | 7/2011 | Mahowald | |
| 2011/0211043 A1 | 9/2011 | Benien et al. | |
| 2011/0249026 A1 | 10/2011 | Singh | |
| 2012/0046078 A1 | 2/2012 | Kim | |
| 2012/0140820 A1 | 6/2012 | Kondo et al. | |
| 2012/0176366 A1 | 7/2012 | Genova | |
| 2012/0262445 A1 | 10/2012 | Bouie | |
| 2013/0021435 A1 | 1/2013 | Yamashita et al. | |
| 2013/0093849 A1 | 4/2013 | He et al. | |
| 2013/0117377 A1 | 5/2013 | Miller | |
| 2013/0207991 A1 | 8/2013 | Sato et al. | |
| 2013/0222542 A1 | 8/2013 | Tsukagoshi | |
| 2013/0242049 A1* | 9/2013 | Sung .................... | H04N 13/161 348/43 |
| 2013/0242262 A1 | 9/2013 | Lewis | |
| 2013/0342453 A1 | 12/2013 | Lee et al. | |
| 2014/0028810 A1 | 1/2014 | Genova | |
| 2014/0071539 A1 | 3/2014 | Gao | |
| 2014/0184496 A1 | 7/2014 | Gribetz et al. | |
| 2014/0267420 A1 | 9/2014 | Schowengerdt et al. | |
| 2014/0267941 A1 | 9/2014 | Ellsworth et al. | |
| 2014/0285641 A1 | 9/2014 | Kato et al. | |
| 2014/0306866 A1 | 10/2014 | Miller et al. | |
| 2015/0016777 A1 | 1/2015 | Abovitz et al. | |
| 2015/0029218 A1 | 1/2015 | Williams et al. | |
| 2015/0103306 A1 | 4/2015 | Kaji et al. | |
| 2015/0138318 A1 | 5/2015 | Jacobs et al. | |
| 2015/0178939 A1 | 6/2015 | Bradski et al. | |
| 2015/0205126 A1 | 7/2015 | Schowengerdt | |
| 2015/0222883 A1 | 8/2015 | Welch | |
| 2015/0222884 A1 | 8/2015 | Cheng | |
| 2015/0228118 A1 | 8/2015 | Eade et al. | |
| 2015/0234184 A1 | 8/2015 | Schowengerdt et al. | |
| 2015/0268415 A1 | 9/2015 | Schowengerdt et al. | |
| 2015/0269736 A1 | 9/2015 | Hannuksela et al. | |
| 2015/0277121 A1 | 10/2015 | Fridental et al. | |
| 2015/0286340 A1* | 10/2015 | Send ..................... | G01S 17/66 250/206.1 |
| 2015/0302652 A1 | 10/2015 | Miller et al. | |
| 2015/0309263 A2 | 10/2015 | Abovitz et al. | |
| 2015/0317833 A1 | 11/2015 | Ebstyne et al. | |
| 2016/0026253 A1 | 1/2016 | Bradski et al. | |
| 2016/0033770 A1 | 2/2016 | Fujimaki et al. | |
| 2016/0035140 A1 | 2/2016 | Bickerstaff et al. | |
| 2016/0154244 A1 | 6/2016 | Border et al. | |
| 2016/0284121 A1 | 9/2016 | Azuma et al. | |
| 2016/0337638 A1 | 11/2016 | Jacobs et al. | |
| 2017/0018121 A1 | 1/2017 | Lawson et al. | |
| 2017/0053450 A1 | 2/2017 | Rodriguez et al. | |
| 2017/0119298 A1 | 5/2017 | Cheung | |
| 2017/0126999 A1 | 5/2017 | Elikhis et al. | |
| 2017/0206713 A1 | 7/2017 | Lo et al. | |
| 2017/0302903 A1 | 10/2017 | Ng et al. | |
| 2018/0061139 A1 | 3/2018 | Rodriguez et al. | |
| 2018/0075659 A1 | 3/2018 | Browy et al. | |
| 2018/0091847 A1 | 3/2018 | Wu et al. | |
| 2019/0260931 A1 | 8/2019 | Rodriguez et al. | |
| 2020/0314335 A1 | 10/2020 | Rodriguez et al. | |
| 2023/0021443 A1 | 1/2023 | Rodriguez et al. | |
| 2023/0421894 A1 | 12/2023 | Rodriguez et al. | |

FOREIGN PATENT DOCUMENTS

| | | |
|---|---|---|
| JP | 2007148567 A | 6/2007 |
| JP | 2008187366 A | 8/2008 |
| JP | 2009025919 A | 2/2009 |
| JP | 2006208767 A | 1/2012 |
| JP | 2013254151 A | 12/2013 |
| JP | 2014135243 B | 11/2016 |
| KR | 20150071595 A | 6/2015 |
| WO | 2013049248 A2 | 4/2013 |
| WO | 2014078037 A2 | 5/2014 |
| WO | 2014164901 A1 | 10/2014 |
| WO | 2016105521 A1 | 6/2016 |
| WO | 2017031246 A1 | 2/2017 |

OTHER PUBLICATIONS

Azuma, "A Survey of Augmented Reality," Teleoperators and Virtual Environments 6, 4 (Aug. 1997), pp. 355-385. https://web.archive.org/web/20010604100006/http://www.cs.unc.edu/azuma/ARpresence.pdf.

Azuma, "Predictive Tracking for Augmented Realty," TR95-007, Department of Computer Science, UNC-Chapel Hill, NC, Feb. 1995.

Bimber, et al., "Spatial Augmented Reality—Merging Real and Virtual Worlds," 2005 https://web.media.mit.edu/raskar/book/BimberRaskarAugmentedRealityBook.pdf.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Tanriverdi and Jacob, "Interacting With Eye Movements in Virtual Environments," Department of Electrical Engineering and Computer Science, Tufts University, Medford, MA—paper/Proc. AMC

(56) References Cited

OTHER PUBLICATIONS

CHI 2000 Human Factors in Computing Systems Conference, pp. 265-272, Addison-Wesley/ACM Press (2000).

* cited by examiner

VIRTUAL AND AUGMENTED REALITY SYSTEMS AND METHODS USING DISPLAY SYSTEM CONTROL INFORMATION EMBEDDED IN IMAGE DATA

PRIORITY CLAIM

This application is a continuation of U.S. patent application Ser. No. 18/462,891, filed Sep. 7, 2023, which is a continuation of U.S. patent application Ser. No. 17/961,462, filed Oct. 6, 2022, which is a continuation of U.S. patent application Ser. No. 16/902,820, filed on Jun. 16, 2020, which is a continuation of U.S. patent application Ser. No. 15/902,710, filed on Feb. 22, 2018. The entire contents of each of the above-listed applications are hereby incorporated by reference into this application.

CROSS-REFERENCE TO RELATED APPLICATIONS

This application is related to U.S. application Ser. No. 15/239,710 filed on Aug. 17, 2016, entitled "VIRTUAL AND AUGMENTED REALITY SYSTEMS AND METHODS," and U.S. application Ser. No. 15/804,356 filed on Nov. 6, 2017, entitled "VIRTUAL AND AUGMENTED REALITY SYSTEMS AND METHODS," each of which are incorporated by reference herein in their entirety.

BACKGROUND

Field

This disclosure relates to virtual and augmented reality imaging and visualization systems.

Description of the Related Art

Modern computing and display technologies have facilitated the development of virtual reality and augmented reality systems. Virtual reality, or "VR," systems create a simulated environment for a user to experience. This can be done by presenting computer-generated imagery to the user through a display. This imagery creates a sensory experience which immerses the user in the simulated environment. A virtual reality scenario typically involves presentation of only computer-generated imagery rather than also including actual real-world imagery.

Augmented reality systems generally supplement a real-world environment with simulated elements. For example, augmented reality, or "AR," systems may provide a user with a view of the surrounding real-world environment via a display. However, computer-generated imagery can also be presented on the display to enhance the real-world environment. This computer-generated imagery can include elements which are contextually related to the real-world environment. Such elements can include simulated text, images, objects, etc. The simulated elements can often be interactive in real time. FIG. 1 depicts an example augmented reality scene 1 where a user of an AR technology sees a real-world park-like setting 6 featuring people, trees, buildings in the background, and a concrete platform 1120. In addition to these items, computer-generated imagery is also presented to the user. The computer-generated imagery can include, for example, a robot statue 1110 standing upon the real-world platform 1120, and a cartoon-like avatar character 2 flying by which seems to be a personification of a bumble bee, even though these elements 2, 1110 are not actually present in the real-world environment.

Because the human visual perception system is complex, it is challenging to produce a VR or AR technology that facilitates a comfortable, natural-feeling, rich presentation of virtual image elements amongst other virtual or real-world imagery elements.

SUMMARY

In some embodiments, a virtual or augmented reality display system comprises: a display configured to display imagery for a plurality of depth planes; a display controller configured to receive rendered virtual or augmented reality imagery data from a graphics processor, and to control the display based at least in part on control information embedded in the rendered imagery, wherein the embedded control information indicates a shift to apply to at least a portion of the rendered imagery when displaying the imagery.

In some embodiments, the shift alters the displayed position of one or more virtual or augmented reality objects as compared to the position of the one or more objects in the rendered imagery.

In some embodiments, the shift comprises a lateral shift of at least a portion of the imagery by a specified number of pixels within the same depth plane.

In some embodiments, the shift comprises a longitudinal shift of at least a portion of the imagery from one depth plane to another.

In some embodiments, the display controller is further configured to scale at least a portion of the imagery in conjunction with a longitudinal shift from one depth plane to another.

In some embodiments, the shift comprises a longitudinal shift of at least a portion of the imagery from one depth plane to a virtual depth plane, the virtual depth plane comprising a weighted combination of at least two depth planes.

In some embodiments, the shift is based on information regarding a head pose of a user.

In some embodiments, the shift is performed by the display controller without re-rendering the imagery.

In some embodiments, a method in a virtual or augmented reality display system comprises: receiving rendered virtual or augmented reality imagery data from a graphics processor; and displaying the imagery for a plurality of depth planes based at least in part on control information embedded in the rendered imagery, wherein the embedded control information indicates a shift to apply to at least a portion of the rendered imagery when displaying the imagery.

In some embodiments, the method further comprises shifting the displayed position of one or more virtual or augmented reality objects as compared to the position of the one or more objects in the rendered imagery.

In some embodiments, the method further comprises laterally shifting at least a portion of the imagery by a specified number of pixels within the same depth plane based on the control information.

In some embodiments, the method further comprises longitudinally shifting at least a portion of the imagery from one depth plane to another based on the control information.

In some embodiments, the method further comprises scaling at least a portion of the imagery in conjunction with longitudinally shifting the imagery from one depth plane to another.

In some embodiments, the method further comprises longitudinally shifting at least a portion of the imagery from one depth plane to a virtual depth plane, the virtual depth plane comprising a weighted combination of at least two depth planes.

In some embodiments, the shift is based on information regarding a head pose of a user.

In some embodiments, the method further comprises shifting the imagery without re-rendering the imagery.

In some embodiments, a virtual or augmented reality display system comprises: a display configured to display virtual or augmented reality imagery for a plurality of depth planes, the imagery comprising a series of images made up of rows and columns of pixel data; a display controller configured to receive the imagery from a graphics processor and to control the display based at least in part on control information embedded in the imagery, wherein the embedded control information comprises depth plane indicator data which indicates at which of the plurality of depth planes to display at least a portion of the imagery.

In some embodiments, the control information does not alter the number of rows and columns of pixel data in the series of images.

In some embodiments, the control information comprises a row or column of information substituted for a row or column of pixel data in one or more of the series of images.

In some embodiments, the control information comprises a row or column of information appended to the pixel data for one or more of the series of images.

In some embodiments, the pixel data comprises a plurality of color values, and wherein the depth plane indicator data is substituted for one or more bits of at least one of the color values.

In some embodiments, the depth plane indicator data is substituted for one or more least significant bits of at least one of the color values.

In some embodiments, the depth plane indicator data is substituted for one or more bits of a blue color value.

In some embodiments, each pixel comprises depth plane indicator data.

In some embodiments, the display controller is configured to order the series of images based at least in part on the depth plane indicator data.

In some embodiments, a method in a virtual or augmented reality display system comprises: receiving virtual or augmented reality imagery from a graphics processor, the imagery comprising a series of images made up of rows and columns of pixel data for a plurality of depth planes; displaying the imagery based at least in part on control information embedded in the imagery, wherein the embedded control information comprises depth plane indicator data which indicates at which of the plurality of depth planes to display at least a portion of the imagery.

In some embodiments, the control information does not alter the number of rows and columns of pixel data in the series of images.

In some embodiments, the control information comprises a row or column of information substituted for a row or column of pixel data in one or more of the series of images.

In some embodiments, the control information comprises a row or column of information appended to the pixel data for one or more of the series of images.

In some embodiments, the pixel data comprises a plurality of color values, and wherein the depth plane indicator data is substituted for one or more bits of at least one of the color values.

In some embodiments, the depth plane indicator data is substituted for one or more least significant bits of at least one of the color values.

In some embodiments, the depth plane indicator data is substituted for one or more bits of a blue color value.

In some embodiments, each pixel comprises depth plane indicator data.

In some embodiments, the method further comprises ordering the series of images based at least in part on the depth plane indicator data.

In some embodiments, a virtual or augmented reality display system comprises: a first sensor configured to provide measurements of a user's head pose over time; and a processor configured to estimate the user's head pose based on at least one head pose measurement and based on at least one calculated predicted head pose, wherein the processor is configured to combine the head pose measurement and the predicted head pose using one or more gain factors, and wherein the one or more gain factors vary based upon the user's head pose position within a physiological range of movement.

In some embodiments, the first sensor is configured to be head-mounted.

In some embodiments, the first sensor comprises an inertial measurement unit.

In some embodiments, the one or more gain factors emphasize the predicted head pose over the head pose measurement when the user's head pose is in a central portion of the physiological range of movement.

In some embodiments, the one or more gain factors emphasize the predicted head pose over the head pose measurement when the user's head pose is nearer the middle of the physiological range of movement than a limit of the user's physiological range of movement.

In some embodiments, the one or more gain factors emphasize the head pose measurement over the predicted head pose when the user's head pose approaches a limit of the physiological range of movement.

In some embodiments, the one or more gain factors emphasize the head pose measurement over the predicted head pose when the user's head pose is nearer a limit of the physiological range of movement than the middle of the physiological range of movement.

In some embodiments, the first sensor is configured to be head-mounted and further comprising a second sensor configured to be body-mounted, wherein the at least one head pose measurement is determined based on measurements from both the first sensor and the second sensor.

In some embodiments, the head pose measurement is determined based on a difference between measurements from the first sensor and the second sensor.

In some embodiments, a method of estimating head pose in a virtual or augmented reality display system comprises: receiving measurements of a user's head pose over time from a first sensor; and estimating, using a processor, the user's head pose based on at least one head pose measurement and based on at least one calculated predicted head pose, wherein estimating the user's head pose comprises combining the head pose measurement and the predicted head pose using one or more gain factors, and wherein the one or more gain factors vary based upon the user's head pose position within a physiological range of movement.

In some embodiments, the first sensor is configured to be head-mounted and the method further comprises: receiving body orientation measurements from a second sensor configured to be body-mounted; and estimating the user's head pose based on the at least one head pose measurement and based on the at least one calculated predicted head pose, wherein the at least one head pose measurement is determined based on measurements from both the first sensor and the second sensor.

In some embodiments, a virtual or augmented reality display system comprises: a sensor configured to determine one or more characteristics of the ambient lighting; a processor configured to adjust one or more characteristics of a virtual object based on the one or more characteristics of the ambient lighting; and a display configured to display the virtual object to a user.

In some embodiments, the one or more characteristics of the ambient lighting comprise the brightness of the ambient lighting.

In some embodiments, the one or more characteristics of the ambient lighting comprise the hue of the ambient lighting.

In some embodiments, the one or more characteristics of the virtual object comprise the brightness of the virtual object.

In some embodiments, the one or more characteristics of the virtual object comprise the hue of the virtual object.

In some embodiments, a method in a virtual or augmented reality display system comprises: receiving one or more characteristics of the ambient lighting from a sensor; adjusting, using a processor, one or more characteristics of a virtual object based on the one or more characteristics of the ambient lighting; and displaying the virtual object to a user.

In some embodiments, a virtual or augmented reality display system comprises: a processor configured to compress virtual or augmented reality imagery data, the imagery comprising imagery for multiple depth planes, the processor being configured to compress the imagery data by reducing redundant information between the depth planes of the imagery; a display configured to display the imagery for the plurality of depth planes.

In some embodiments, the imagery for a depth plane is represented in terms of differences with respect to an adjacent depth plane.

In some embodiments, the processor encodes motion of an object between depth planes.

In some embodiments, a method in a virtual or augmented reality display system comprises: compressing virtual or augmented reality imagery data with a processor, the imagery comprising imagery for multiple depth planes, the processor being configured to compress the imagery data by reducing redundant information between the depth planes of the imagery; displaying the imagery for the plurality of depth planes.

In some embodiments, the imagery for a depth plane is represented in terms of differences with respect to an adjacent depth plane.

In some embodiments, the method further comprises encoding motion of an object between depth planes.

In some embodiments, a virtual or augmented reality display system comprises: a display configured to display virtual or augmented reality imagery for a plurality of depth planes; a display controller configured to control the display, wherein the display controller dynamically configures a sub-portion of the display to refresh per display cycle.

In some embodiments, the display comprises a scanning display and the display controller dynamically configures the scanning pattern to skip areas of the display where the imagery need not be refreshed.

In some embodiments, the display cycle comprises a frame of video imagery.

In some embodiments, the display controller increases the video frame rate if the sub-portion of the display to be refreshed decreases in size.

In some embodiments, the display controller decreases the video frame rate if the sub-portion of the display to be refreshed increases in size.

In some embodiments, a method in a virtual or augmented reality display system comprises: displaying virtual or augmented reality imagery for a plurality of depth planes with a display; dynamically configuring a sub-portion of the display to refresh per display cycle.

In some embodiments, the display comprises a scanning display and the method further comprises dynamically configuring the scanning pattern to skip areas of the display where the imagery need not be refreshed.

In some embodiments, the display cycle comprises a frame of video imagery.

In some embodiments, the method further comprises increasing the video frame rate if the sub-portion of the display to be refreshed decreases in size.

In some embodiments, the method further comprises decreasing the video frame rate if the sub-portion of the display to be refreshed increases in size.

In some embodiments, a virtual or augmented reality display system comprises: a transmitter which transmits an electric or magnetic field that varies in space; a tangible object which allows a user to interact with a virtual object or scene, the tangible object comprising a sensor which detects the electric or magnetic field from the transmitter, wherein measurements from the sensor are used to determine the position or orientation of the tangible object with respect to the transmitter.

In some embodiments, the transmitter is integrated with a head-mounted portion of the virtual or augmented reality display system.

In some embodiments, a method in a virtual or augmented reality display system comprises: transmitting an electric or magnetic field that varies in space using a transmitter; detecting the electric or magnetic field using a sensor; using measurements from the sensor to determine the position or orientation of the sensor with respect to the transmitter.

In some embodiments, the transmitter is integrated with a head-mounted portion of the virtual or augmented reality display system.

In some embodiments, a virtual or augmented reality display system comprises a display configured to display imagery for a plurality of depth planes; a display controller configured to receive rendered virtual or augmented reality imagery data, and to control the display based at least in part on control information embedded in the rendered imagery, wherein the embedded control information indicates a desired brightness or color to apply to at least a portion of the rendered imagery when displaying the imagery. The desired brightness or color can alter the displayed position of one or more virtual or augmented reality objects as compared to the position of the one or more objects in the rendered imagery. The desired brightness or color can longitudinal shift at least a portion of the imagery from one depth plane to a virtual depth plane, the virtual depth plane comprising a weighted combination of at least two depth planes.

In some embodiments, a virtual or augmented reality display system comprises: a display configured to display imagery for a plurality of depth planes; a display controller configured to receive rendered virtual or augmented reality imagery data, and to control the display based at least in part on control information, wherein the control information indicates that at least one depth plane is inactive and the display controller is configured to control inputs to the display based on the indication that at least one depth plane is inactive, thereby reducing net power consumption of the system.

In some embodiments, the indication that at least one depth plane is inactive comprises control information comprising depth plane indicator data that specifies a plurality of active depth planes to display the imagery.

In some embodiments, indication that at least one depth plane is inactive comprises control information comprising depth plane indicator data that specifies that at least one depth plane is inactive.

In some embodiments, the control information is embedded in the rendered imagery.

In some embodiments, the display controller causes one or more light sources to be reduced in power thereby reducing net power consumption of the system. In some embodiments, reduction in power is by decreasing an amplitude of an intensity input. In some embodiments, reduction in power is by supplying no power to the one or more light sources.

In some embodiments, a method in a virtual or augmented reality display system comprises: receiving rendered virtual or augmented reality imagery data for displaying imagery on a plurality of depth planes; receiving control information indicating that at least one depth plane is inactive; and displaying the imagery for a plurality of depth planes based at least in part on said control information indicating that at least one depth plane is inactive, thereby reducing net power consumption of the system.

In some embodiments, the control information comprises depth plane indicator data that specifies a plurality of active depth planes to display the imagery.

In some embodiments, the control information comprises depth plane indicator data that specifies at least one depth plane that is inactive.

In some embodiments, the control information is embedded in the rendered imagery.

In some embodiments, upon control information indicating that at least one depth plane is inactive, one or more light sources is reduced in power thereby reducing net power consumption of the system. In some embodiments, reduction in power is by decreasing an amplitude of an intensity input. In some embodiments, reduction in power is by supplying no power to the one or more light sources.

In some embodiments, a virtual or augmented reality display system comprises: a display configured to display imagery for a plurality of depth planes having a plurality of color fields; a display controller configured to receive rendered virtual or augmented reality imagery data, and to control the display based at least in part on control information, wherein the control information indicates that at least one color field is inactive and the display controller is configured to control inputs to the display based on the indication that at least one color field is inactive, thereby reducing net power consumption of the system.

In some embodiments, the indication that at least one color field is inactive comprises control information comprising color field indicator data that specifies a plurality of active color fields to display the imagery.

In some embodiments, the indication that at least one color field is inactive comprises control information comprising color field indicator data that specifies that at least one color field is inactive.

In some embodiments, the control information is embedded in the rendered imagery.

In some embodiments, the display controller causes one or more light sources to be reduced in power thereby reducing net power consumption of the system. For example, in an RGB LED light source system, an inactive color component in a particular frame direct a single constituent red, green or blue LED family be reduced in power. In some embodiments, reduction in power is by decreasing an amplitude of an intensity input. In some embodiments, reduction in power is by supplying no power to the one or more light sources.

In some embodiments, a method in a virtual or augmented reality display system comprises: receiving rendered virtual or augmented reality imagery data for displaying imagery on a plurality of depth planes having a plurality of color fields; receiving control information indicating that at least one color field is inactive; and displaying the imagery for a plurality of color fields in a plurality of depth planes based at least in part on said control information indicating that at least one color field is inactive, thereby reducing net power consumption of the system.

In some embodiments, the control information comprises color field indicator data that specifies a plurality of active color fields to display the imagery.

In some embodiments, the control information comprises color field indicator data that specifies at least one color field that is inactive.

In some embodiments, the control information is embedded in the rendered imagery.

In some embodiments, upon control information indicating that at least one color field is inactive, one or more light sources is reduced in power thereby reducing net power consumption of the system. For example, in an RGB LED light source system, an inactive color component in a particular frame direct a single constituent red, green or blue LED family be reduced in power. In some embodiments, reduction in power is by decreasing an amplitude of an intensity input. In some embodiments, reduction in power is by supplying no power to the one or more light sources.

DETAILED DESCRIPTION

Figure 2:
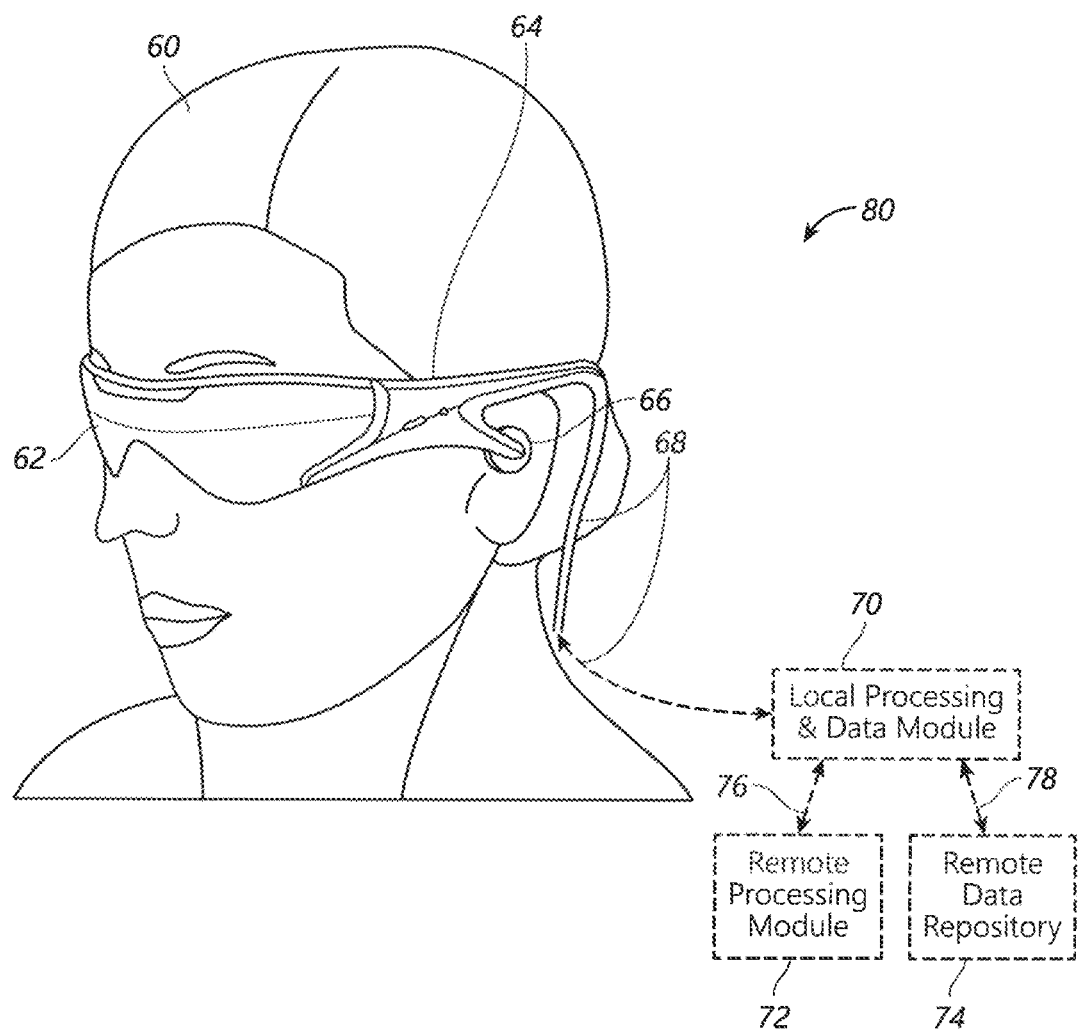
FIG. 2 illustrates an example of wearable display system.

Virtual and augmented reality systems disclosed herein can include a display which presents computer-generated imagery to a user. In some embodiments, the display systems are wearable, which may advantageously provide a more immersive VR or AR experience. FIG. 2 illustrates an example of wearable display system 80. The display system 80 includes a display 62, and various mechanical and electronic modules and systems to support the functioning of that display 62. The display 62 may be coupled to a frame 64, which is wearable by a display system user or viewer 60 and which is configured to position the display 62 in front of the eyes of the user 60. In some embodiments, a speaker 66 is coupled to the frame 64 and positioned adjacent the ear canal of the user (in some embodiments, another speaker, not shown, is positioned adjacent the other ear canal of the user to provide for stereo/shapeable sound control). The display 62 is operatively coupled, such as by a wired or wireless connection 68, to a local data processing module 70 which may be mounted in a variety of configurations, such as fixedly attached to the frame 64, fixedly attached to a helmet or hat worn by the user, embedded in headphones, or otherwise removably attached to the user 60 (e.g., in a backpack-style configuration, in a belt-coupling style configuration, etc.).

The local processing and data module 70 may include a processor, as well as digital memory, such as non-volatile memory (e.g., flash memory), both of which may be utilized to assist in the processing and storing of data. This includes data captured from sensors, such as image capture devices (e.g., cameras), microphones, inertial measurement units, accelerometers, compasses, GPS units, radio devices, and/or gyros. The sensors may be, e.g., operatively coupled to the frame 64 or otherwise attached to the user 60. Alternatively, or additionally, sensor data may be acquired and/or processed using a remote processing module 72 and/or remote data repository 74, possibly for passage to the display 62 after such processing or retrieval. The local processing and data module 70 may be operatively coupled by communication links (76, 78), such as via a wired or wireless communication links, to the remote processing module 72 and remote data repository 74 such that these remote modules (72, 74) are operatively coupled to each other and available as resources to the local processing and data module 70.

In some embodiments, the remote processing module 72 may include one or more processors configured to analyze and process data (e.g., sensor data and/or image information). In some embodiments, the remote data repository 74 may comprise a digital data storage facility, which may be available through the internet or other networking configuration in a "cloud" resource configuration. In some embodiments, all data is stored and all computations are performed in the local processing and data module, allowing fully autonomous use from a remote module.

In some embodiments, the computer-generated imagery provided via the display 62 can create the impression of being three-dimensional. This can be done, for example, by presenting stereoscopic imagery to the user. In some conventional systems, such imagery can include separate images of a scene or object from slightly different perspectives. The separate images can be presented to the user's right eye and left eye, respectively, thus simulating binocular vision and its associated depth perception.

Figure 3:
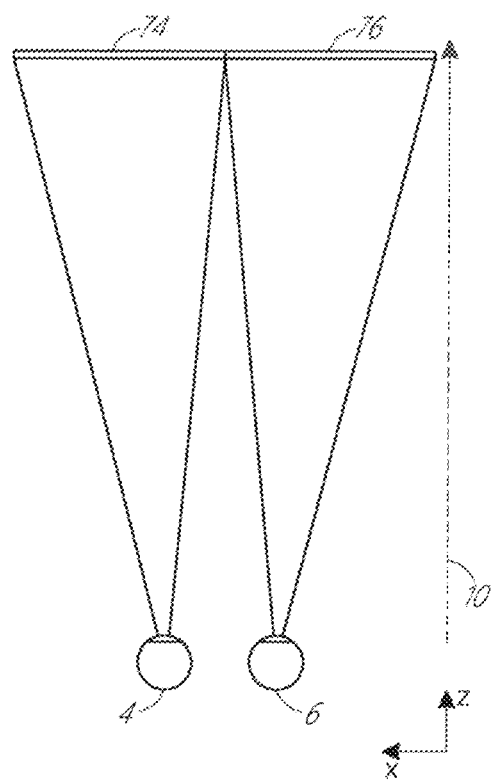
FIG. 3 illustrates a conventional display system for simulating three-dimensional imagery for a user.

FIG. 3 illustrates a conventional display system for simulating three-dimensional imagery for a user. Two distinct images 74 and 76, one for each eye 4 and 6, are outputted to the user. The images 74 and 76 are spaced from the eyes 4 and 6 by a distance 10 along an optical or z-axis parallel to the line of sight of the viewer. The images 74 and 76 are flat and the eyes 4 and 6 may focus on the images by assuming a single accommodated state. Such systems rely on the human visual system to combine the images 74 and 76 to provide a perception of depth for the combined image.

It will be appreciated, however, that the human visual system is more complicated and providing a realistic perception of depth is more challenging. For example, many viewers of conventional 3D display systems find such systems to be uncomfortable or may not perceive a sense of depth at all. Without being limited by theory, it is believed that viewers of an object may perceive the object as being "three-dimensional" due to a combination of vergence and accommodation. Vergence movements (i.e., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. As noted herein, many stereoscopic display systems display a scene using slightly different presentations (and, so, slightly different images) to each eye such that a three-dimensional perspective is perceived by the human visual system. Such systems are uncomfortable for many viewers, however, since they simply provide different presentations of a scene but with the eyes viewing all the image information at a single accommodated state, and thus work against the accommodation-vergence reflex. Display systems that provide a better match between accommodation and vergence may form more realistic and comfortable simulations of three-dimensional imagery.

For example, light field imagery can be presented to the user to simulate a three-dimensional view. Light field imagery can mimic the rays of light which enter the eyes of a viewer in a real-world environment. For example, when displaying light field imagery, light rays from objects that are simulated to be perceived at a distance are made to be more collimated when entering the viewer's eyes, while light rays from objects that are simulated to be perceived nearby are made to be more divergent. Thus, the angles at which light rays from objects in a scene enter the viewer's eyes are dependent upon the simulated distance of those objects from the viewer. Light field imagery in a virtual or augmented reality system can include multiple images of a scene or object from different depth planes. The images may be different for each depth plane (e.g., provide slightly different presentations of a scene or object) and may be separately focused by the viewer's eyes, thereby helping to provide the user with a comfortable perception of depth.

When these multiple depth plane images are presented to the viewer simultaneously or in quick succession, the result is interpreted by the viewer as three-dimensional imagery. When the viewer experiences this type of light field imagery, the eyes accommodate to focus the different depth planes in much the same way as they would do when experiencing a real-world scene. These focal cues can provide for a more realistic simulated three-dimensional environment.

In some configurations, at each depth plane, a full color image may be formed by overlaying component images that each have a particular component color. For example, red, green, and blue images may each be separately outputted to form each full color depth plane image. As a result, each depth plane may have multiple component color images associated with it.

Figure 4:
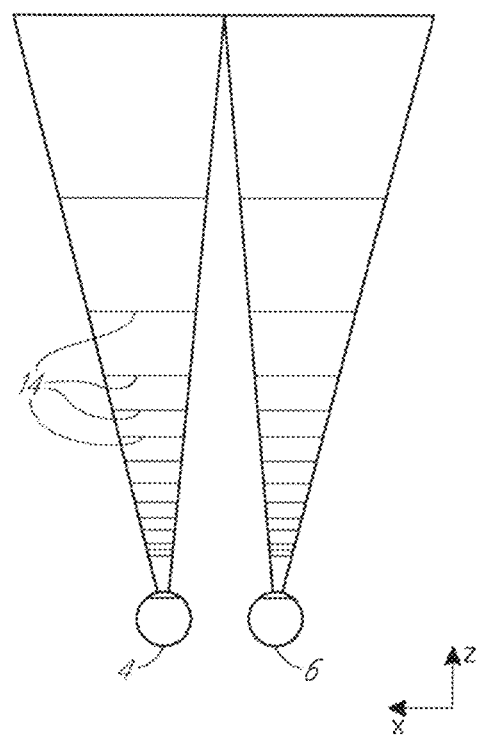
FIG. 4 illustrates aspects of an approach for simulating three-dimensional imagery using multiple depth planes.

FIG. 4 illustrates aspects of an approach for simulating three-dimensional imagery using multiple depth planes. With reference to FIG. 4, objects at various distances from eyes 4 and 6 on the z-axis are accommodated by the eyes (4, 6) so that those objects are in focus. The eyes 4 and 6 assume particular accommodated states to bring into focus objects at different distances along the z-axis. Consequently, a particular accommodated state may be said to be associated with a particular one of depth planes 14, such that objects or parts of objects in a particular depth plane are in focus when the eye is in the accommodated state for that depth plane. In some embodiments, three-dimensional imagery may be simulated by providing different presentations of an image for each of the eyes (4, 6), and also by providing different presentations of the image corresponding to each of the depth planes.

Figure 5A:
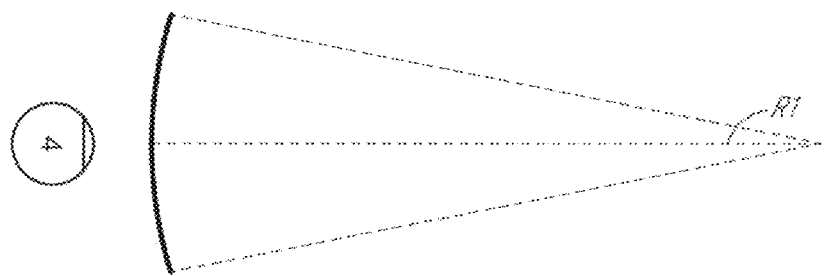
FIGS. 5A-5C illustrate relationships between radius of curvature and focal radius.
Figure 5B:
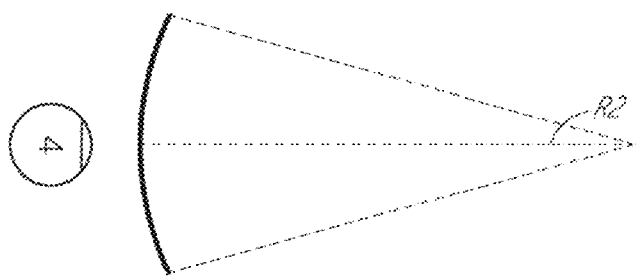
Figure 5C:
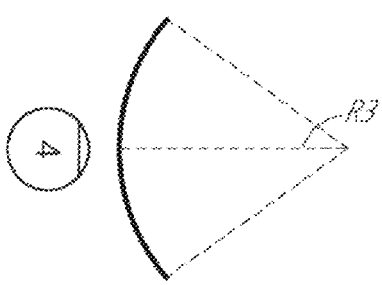

The distance between an object and the eye (4 or 6) can change the amount of divergence of light from that object, as viewed by that eye. FIGS. 5A-5C illustrate relationships between distance and the divergence of light rays. The distance between the object and the eye 4 is represented by, in order of decreasing distance, R1, R2, and R3. As shown in FIGS. 5A-5C, the light rays become more divergent as distance to the object decreases. As distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 4. Consequently, at different depth planes, the degree of divergence of light rays is also different, with the degree of divergence increasing with decreasing distance between depth planes and the viewer's eye 4. While only a single eye 4 is illustrated for clarity of illustration in FIGS. 5A-5C and other figures herein, it will be appreciated that the discussions regarding eye 4 may be applied to both eyes (4 and 6) of a viewer.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes.

Figure 6:
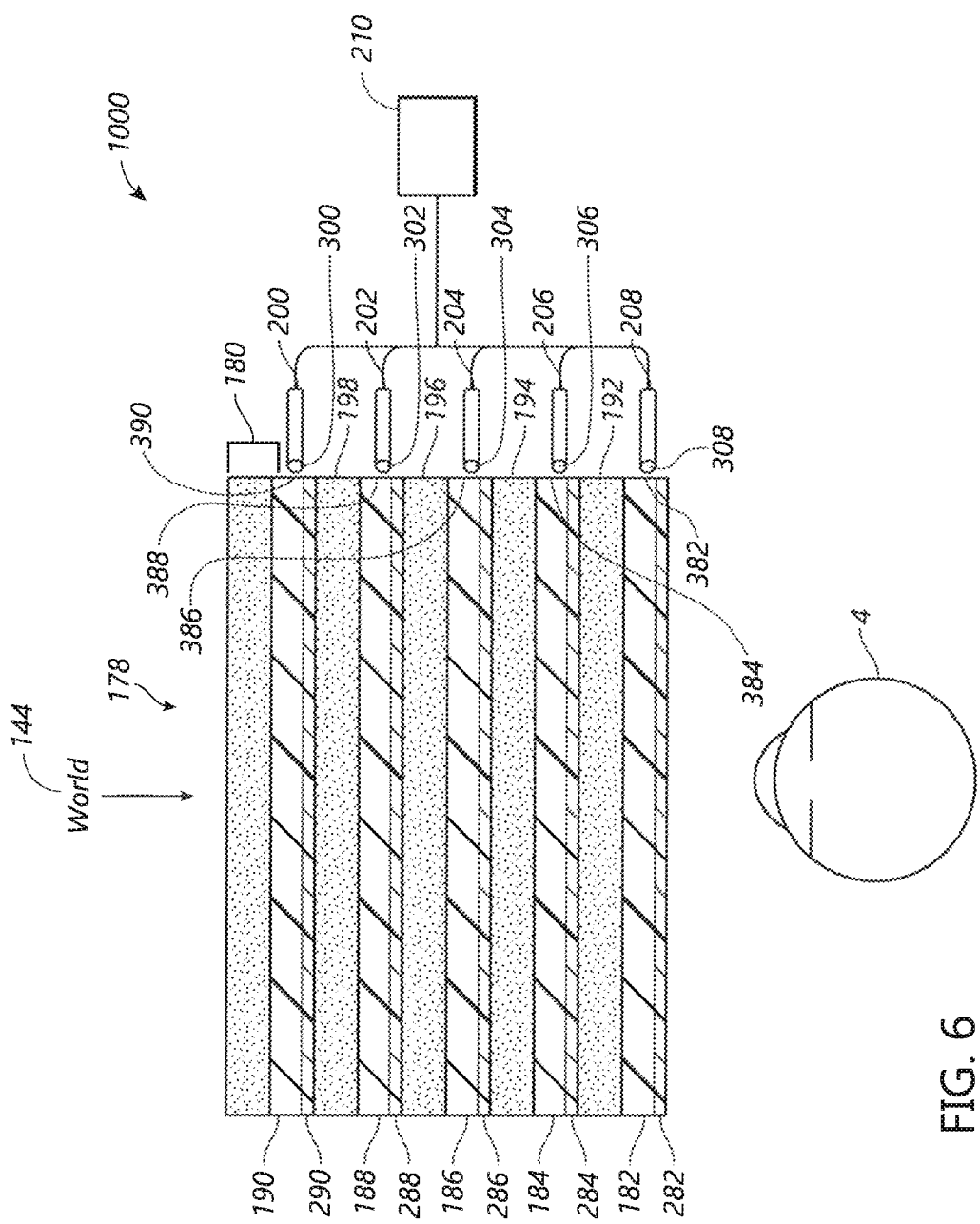
FIG. 6 illustrates an example of a waveguide stack for outputting image information to a user.

FIG. 6 illustrates an example of a waveguide stack for outputting image information to a user. A display system 1000 includes a stack of waveguides, or stacked waveguide assembly 178, that may be utilized to provide three-dimensional perception to the eye/brain using a plurality of waveguides (182, 184, 186, 188, 190). In some embodiments, the display system 1000 is the system 80 of FIG. 2, with FIG. 6 schematically showing some parts of that system 80 in greater detail. For example, the waveguide assembly 178 may be integrated into the display 62 of FIG. 2.

With continued reference to FIG. 6, the waveguide assembly 178 may also include a plurality of features (198, 196, 194, 192) between the waveguides. In some embodiments, the features (198, 196, 194, 192) may be lenses. The waveguides (182, 184, 186, 188, 190) and/or the plurality of lenses (198, 196, 194, 192) may be configured to send image information to the eye with various levels of wavefront curvature or light ray divergence. Each waveguide level may be associated with a particular depth plane and may be configured to output image information corresponding to that depth plane. Image injection devices (200, 202, 204, 206, 208) may be utilized to inject image information into the waveguides (182, 184, 186, 188, 190), each of which may be configured, as described herein, to distribute incoming light across each respective waveguide, for output toward the eye 4. Light exits an output surface (300, 302, 304, 306, 308) of the image injection devices (200, 202, 204, 206, 208) and is injected into a corresponding input edge (382, 384, 386, 388, 390) of the waveguides (182, 184, 186, 188, 190). In some embodiments, a single beam of light (e.g., a collimated beam) may be injected into each waveguide to output an entire field of cloned collimated beams that are directed toward the eye 4 at particular angles (and amounts of divergence) corresponding to the depth plane associated with a particular waveguide.

In some embodiments, the image injection devices (200, 202, 204, 206, 208) are discrete displays that each produce image information for injection into a corresponding waveguide (182, 184, 186, 188, 190, respectively). In some other embodiments, the image injection devices (200, 202, 204, 206, 208) are the output ends of a single multiplexed display which may, e.g., pipe image information via one or more optical conduits (such as fiber optic cables) to each of the image injection devices (200, 202, 204, 206, 208).

A controller 210 controls the operation of the stacked waveguide assembly 178 and the image injection devices (200, 202, 204, 206, 208). In some embodiments, the controller 210 includes programming (e.g., instructions in a non-transitory computer-readable medium) that regulates the timing and provision of image information to the waveguides (182, 184, 186, 188, 190) according to, e.g., any of the various schemes disclosed herein. In some embodiments, the controller may be a single integral device, or a distributed system connected by wired or wireless communication channels. The controller 210 may be part of the processing modules (70 or 72) (FIG. 2) in some embodiments.

The waveguides (182, 184, 186, 188, 190) may be configured to propagate light within each respective waveguide by total internal reflection (TIR). The waveguides (182, 184, 186, 188, 190) may each be planar or curved, with major top and bottom surfaces and edges extending between those major top and bottom surfaces. In the illustrated configuration, the waveguides (182, 184, 186, 188, 190) may each include light redirecting elements (282, 284, 286, 288, 290) that are configured to redirect light, propagating within each respective waveguide, out of the waveguide to output image information to the eye 4. A beam of light is outputted by the waveguide at locations at which the light propagating in the waveguide strikes a light redirecting element. The light redirecting elements (282, 284, 286, 288, 290) may be reflective and/or diffractive optical features. While illustrated disposed at the bottom major surfaces of the waveguides (182, 184, 186, 188, 190) for ease of description and drawing clarity, in some embodiments, the light redirecting elements (282, 284, 286, 288, 290) may be disposed at the top and/or bottom major surfaces, and/or may be disposed directly in the volume of the waveguides (182, 184, 186, 188, 190). In some embodiments, the light redirecting elements (282, 284, 286, 288, 290) may be formed in a layer of material that is attached to a transparent substrate to form the waveguides (182, 184, 186, 188, 190). In some other embodiments, the waveguides (182, 184, 186, 188, 190) may be a monolithic piece of material and the light redirecting elements (282, 284, 286, 288, 290) may be formed on a surface and/or in the interior of that piece of material.

With continued reference to FIG. 6, as discussed herein, each waveguide (182, 184, 186, 188, 190) is configured to output light to form an image corresponding to a particular depth plane. For example, the waveguide 182 nearest the eye may be configured to deliver collimated light, as injected into such waveguide 182, to the eye 4. The collimated light may be representative of the optical infinity focal plane. The next waveguide up 184 may be configured to send out collimated light which passes through the first lens (192; e.g., a negative lens) before it can reach the eye 4; such first lens 192 may be configured to create a slight convex wavefront curvature so that the eye/brain interprets light coming from that next waveguide up 184 as coming from a first focal plane closer inward toward the eye 4 from optical infinity. Similarly, the third up waveguide 186 passes its output light through both the first 192 and second 194 lenses before reaching the eye 4; the combined optical power of the first 192 and second 194 lenses may be configured to create another incremental amount of wavefront curvature so that the eye/brain interprets light coming from the third waveguide 186 as coming from a second focal plane that is even closer inward toward the person from optical infinity than was light from the next waveguide up 184.

The other waveguide layers (188, 190) and lenses (196, 198) are similarly configured, with the highest waveguide 190 in the stack sending its output through all of the lenses between it and the eye for an aggregate focal power representative of the closest focal plane to the person. To compensate for the stack of lenses (198, 196, 194, 192) when viewing/interpreting light coming from the world 144 on the other side of the stacked waveguide assembly 178, a compensating lens layer 180 may be disposed at the top of the stack to compensate for the aggregate power of the lens stack (198, 196, 194, 192) below. Such a configuration provides as many perceived focal planes as there are available waveguide/lens pairings. Both the light redirecting elements of the waveguides and the focusing aspects of the lenses may be static (i.e., not dynamic or electro-active). In some alternative embodiments, they may be dynamic using electro-active features.

With continued reference to FIG. 6, the light redirecting elements (282, 284, 286, 288, 290) may be configured to both redirect light out of their respective waveguides and to output this light with the appropriate amount of divergence or collimation for a particular depth plane associated with the waveguide. As a result, waveguides having different associated depth planes may have different configurations of light redirecting elements (282, 284, 286, 288, 290), which output light with a different amount of divergence depending on the associated depth plane. In some embodiments, as discussed herein, the light redirecting elements (282, 284, 286, 288, 290) may be volumetric or surface features, which may be configured to output light at specific angles. For example, the light redirecting elements (282, 284, 286, 288, 290) may be volume holograms, surface holograms, and/or diffraction gratings. Light redirecting elements, such as diffraction gratings, are described in U.S. patent application Ser. No. 14/641,376, filed Mar. 7, 2015, which is incorporated by reference herein in its entirety. In some embodiments, the features (198, 196, 194, 192) may not be lenses; rather, they may simply be spacers (e.g., cladding layers and/or structures for forming air gaps).

In some embodiments, the light redirecting elements (282, 284, 286, 288, 290) are diffractive features that form a diffraction pattern, or "diffractive optical element" (also referred to herein as a "DOE"). Preferably, the DOEs have a relatively low diffraction efficiency so that only a portion of the light of the beam is deflected away toward the eye 4 with each intersection of the DOE, while the rest continues to move through a waveguide via total internal reflection. The light carrying the image information is thus divided into a number of related exit beams that exit the waveguide at a multiplicity of locations and the result is a fairly uniform pattern of exit emission toward the eye 4 for this particular collimated beam reflecting around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

Figure 7:
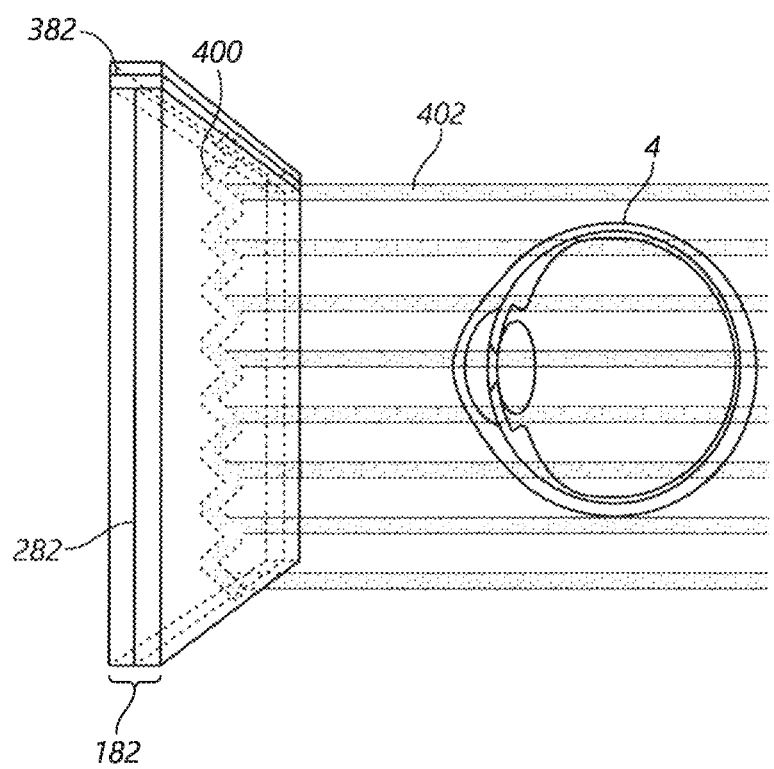
FIG. 7 shows an example of exit beams outputted by a waveguide.

FIG. 7 shows an example of exit beams outputted by a waveguide. One waveguide is illustrated, but it will be appreciated that other waveguides in the stack of waveguides 178 may function similarly. Light 400 is injected into the waveguide 182 at the input edge 382 of the waveguide 182 and propagates within the waveguide 182 by TIR. At points where the light 400 impinges on the DOE 282, a portion of the light exits the waveguide as exit beams 402. The exit beams 402 are illustrated as substantially parallel but, as discussed herein, they may also be redirected to propagate to the eye 4 at an angle (e.g., forming divergent exit beans), depending on the depth plane associated with the waveguide 182. It will be appreciated that substantially parallel exit beams may be indicative of a waveguide that corresponds to a depth plane at a large simulated distance (e.g., optical infinity) from the eye 4. Other waveguides may output an exit beam pattern that is more divergent, which would require the eye 4 to accommodate to focus on a closer simulated distance and would be interpreted by the brain as light from a distance closer to the eye 4 than optical infinity.

Figure 8:
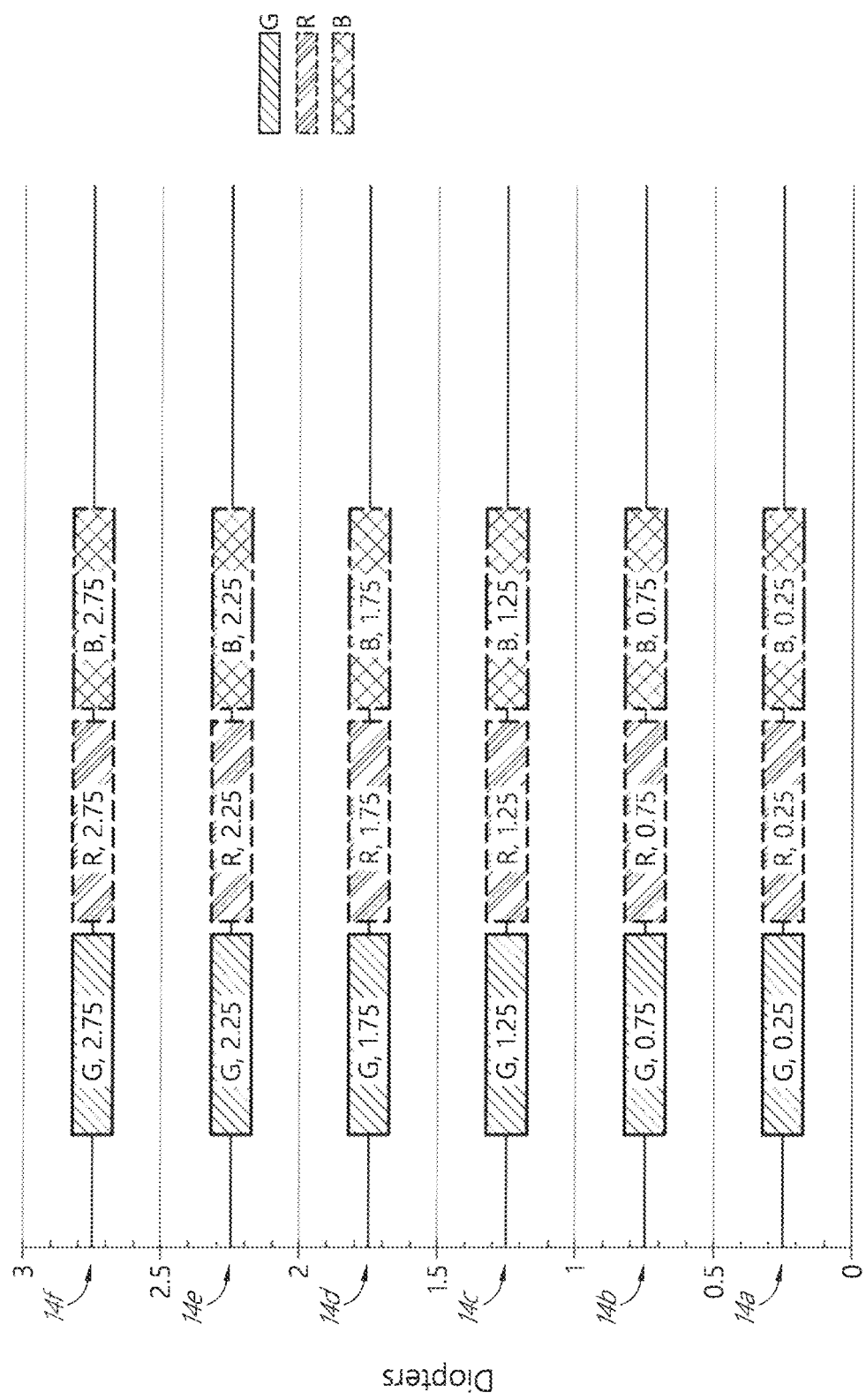
FIG. 8 illustrates an example design of a waveguide stack in which each depth plane has three associated waveguides that each output light of a different color.

FIG. 8 schematically illustrates an example design of a stacked waveguide assembly in which each depth plane has three associated waveguides that each output light of a different color. A full color image may be formed at each depth plane by overlaying images in each of multiple component colors, e.g., three or more component colors. In some embodiments, the component colors include red, green, and blue. In some other embodiments, other colors, including magenta, yellow, and cyan, may be used in conjunction with or may replace one of red, green, or blue. Each waveguide may be configured to output a particular component color and, consequently, each depth plane may have multiple waveguides associated with it. Each depth plane may have, e.g., three waveguides associated with it: one for outputting red light, a second for outputting green light, and a third for outputting blue light.

With continued reference to FIG. 8, depth planes 14a-14f are shown. In the illustrated embodiment, each depth plane has three component color images associated with it: a first image of a first color, G; a second image of a second color, R; and a third image of a third color, B. As a convention herein, the numbers following each of these letters indicate diopters (1/m), or the reciprocal of the apparent distance of the depth plane from a viewer, and each box in the figures represents an individual component color image. In some embodiments, G is the color green, R is the color red, and B is the color blue. As discussed above, the perceived distance of the depth plane from the viewer may be established by the light redirecting elements (282, 284, 286, 288, 290), e.g., diffractive optical element (DOE), and/or by lenses (198, 196, 194, 192), which cause the light to diverge at an angle associated with the apparent distance.

In some arrangements, each component color image may be outputted by a different waveguide in a stack of waveguides. For example, each depth plane may have three component color images associated with it: a first waveguide to output a first color, G; a second waveguide to output a second color, R; and a third waveguide to output a third color, B. In arrangements in which waveguides are used to output component color images, each box in the figure may be understood to represent an individual waveguide.

While the waveguides associated with each depth plane are shown adjacent to one another in this schematic drawing for ease of description, it will be appreciated that, in a physical device, the waveguides may all be arranged in a stack with one waveguide per level. Different depth planes are indicated in the figure by different numbers for diopters following the letters G, R, and B.

Display Timing Schemes

In some embodiments, a virtual or augmented reality system provides light field imagery by successively displaying multiple different depth planes for a given frame of video data. The system then updates to the next frame of video data and successively displays multiple different depth planes for that frame. For example, the first frame of video data can actually include three separate sub-frames of data: a far field frame D0, a midfield frame D1, and a near field frame D2. D0, D1, and D2 can be displayed in succession. Subsequently, the second frame of video data can be displayed. The second frame of video data can likewise include a far field frame, a midfield frame, and a near field frame, which are displayed successively, and so on. While this example uses three depth planes, light field imagery is not so limited. Rather, any plural number of depth planes can be used depending, for example, upon the desired video frame rates and the capabilities of the system.

Because each frame of light field video data includes multiple sub-frames for different depth planes, systems which provide light field imagery may benefit from display panels which are capable of high refresh rates. For example, if the system displays video with a frame rate of 120 Hz but includes imagery from multiple different depth planes, then the display will need to be capable of a refresh rate greater than 120 Hz in order to accommodate the multiple depth plane images for each frame of video. In some embodiments, Liquid Crystal Over Silicon (LCOS) display panels are used, though other types of display panels can also be used (including color sequential displays and non-color sequential displays).

Figure 9:
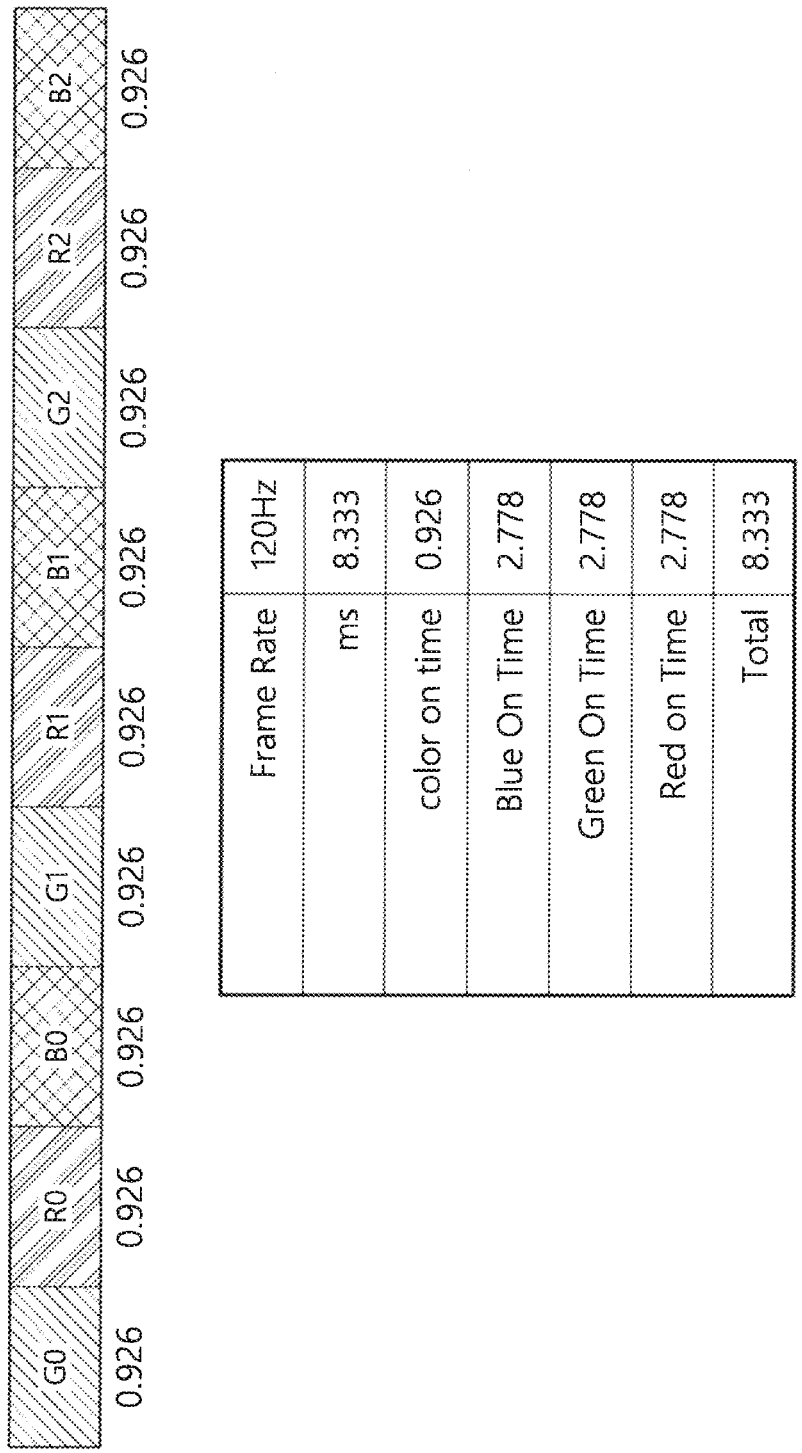
FIG. 9 illustrates an example timing scheme for a virtual or augmented reality system which displays light field imagery.

FIG. 9 illustrates an example timing scheme for a virtual or augmented reality system which displays light field imagery. In this example, the video frame rate is 120 Hz and the light field imagery includes three depth planes. In some embodiments, the green, red, and blue components of each frame are displayed serially rather than at the same time.

A video frame rate of 120 Hz allows 8.333 ms in which to display all of the depth planes for a single frame of video. As illustrated in FIG. 9, each frame of video data includes three depth planes and each depth plane includes green, red, and blue components. For example the depth plane D0 includes a green sub-frame, G0, a red sub-frame, R0, and a blue sub-frame, B0. Similarly, the depth plane D1 comprises green, red, and blue sub-frames, G1, R1, and B1, respectively, and the depth plane D2 comprises green, red, and blue sub-frames, G2, R2, and B2, respectively. Given that each video frame comprises three depth planes, and each depth plane has three color components, the allotted 8.333 ms is divided into nine segments of 0.926 ms each. As illustrated in FIG. 9, the green sub-frame G0 for the first depth plane is displayed during the first time segment, the red sub-frame R0 for the first depth plane is displayed during the second time segment, and so on. The total green on-time for each frame of video is 2.778 ms. The same is true of the total red on-time and blue on-time for each video frame. It should be understood, however, that other video frame rates can also be used, in which case the specific time intervals illustrated in FIG. 9 could be adjusted accordingly. While the individual color components are illustrated as having equal display times, this is not required and the ratios of the display times between the color components can be varied. Furthermore, the flashing order illustrated in FIG. 9 for the depth planes and color component sub-frames is but one example. Other flashing orders can also be used. Moreover, while FIG. 9 illustrates an embodiment which uses a color sequential display technology, the techniques described herein are not limited to color sequential displays.

Other display timing schemes are also possible. For example, the frame rate, number of depth planes, and color components can vary. In some embodiments, the frame rate of a virtual or augmented reality system as described herein is 80 Hz and there are three depth planes. In some embodiments, different depth planes can be displayed in different frames. For example, light field video with four depth planes can be displayed at an effective frame rate of 60 Hz by displaying two depth planes per frame at a frame rate of 120 Hz (depth planes D0 and D1 can be displayed in the first 8.33 ms and depth planes D2 and D3 can be displayed in the next 8.33 ms-full depth information is provided in 16.7 ms, for an effective frame rate of 60 Hz). In some embodiments, the number of depth planes which are shown can vary spatially on the display. For example, a larger number of depth planes can be shown in a sub-portion of the display in the user's line of sight, and a smaller number of depth planes can be shown in sub-portions of the display located in the user's peripheral vision. In such embodiments, an eye tracker (e.g., a camera and eye tracking software) can be used to determine which portion of the display the user is looking at.

Control Information for Video Data

Figure 10:
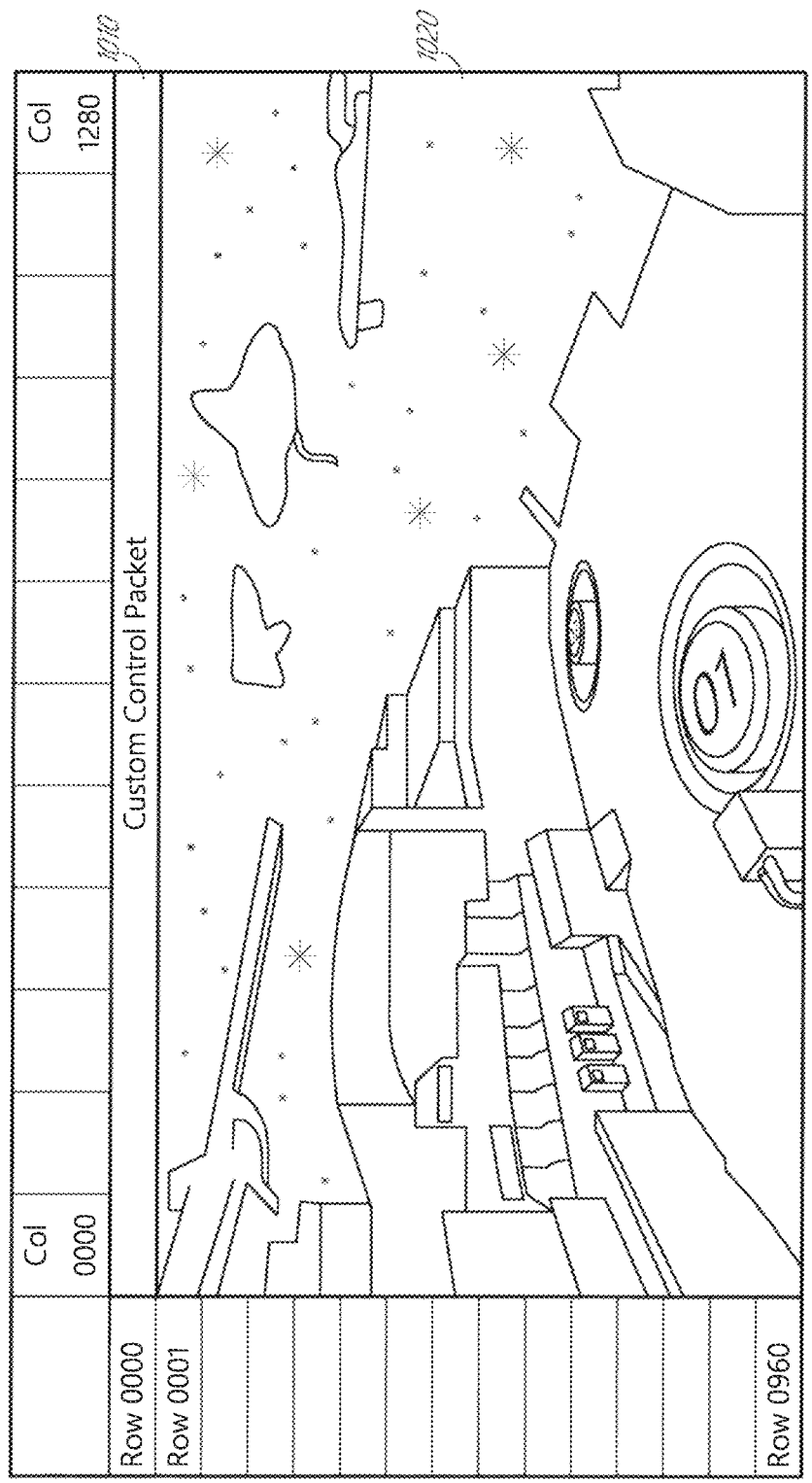
FIG. 10 illustrates an example format for a frame of video data which includes appended control information.

FIG. 10 illustrates an example format for a frame of video data which includes appended control information. As illustrated in FIG. 10, each frame of video data may comprise an array of pixel data (image information 1020) formatted into rows and columns. In the illustrated example, there are 1280 columns and 960 rows of pixel data in the image information 1020 which form an image. FIG. 10 also illustrates that control information 1010 can be appended to the image information 1020. In this example, a control packet 1010 can be appended to as the image information 1020, for example, an extra row. The first row (Row 000) comprises the control information 1010, whereas Rows 1-960 contain the image information 1020. Thus, in this embodiment, the host transmits a resolution of 1280×961 to the display controller.

The display controller reads the appended control information 1010 and uses it, for example, to configure the image information 1020 sent to one or more display panels (e.g., a left-eye and a right-eye display panel). In this example, the row of control information 1010 is not sent to the display panels. Thus, while the host transmits information, including the control information 1010 and the image information 1020, to the display controller with a resolution of 1280× 961, the display controller removes the control information 1010 from the stream of data and transmits only the image information 1020 to the display panel(s) with a resolution of 1280×960. The image information 1020 can be transmitted to a display panel (e.g., an LCOS display panel) in, for example, Display Serial Interface (DSI) format. While FIG. 10 illustrates that the appended control information 1010 comprises a single row appended at the beginning of each frame of video data, other amounts of control information could alternatively be appended. Further, the control information 1010 does not necessarily have to be appended at the beginning of each frame of video data but could instead be inserted into the video data at other locations. However, appending control information 1010 at the beginning of a frame may allow the controller to more readily act on the control information 1010 at the beginning of a frame of rendered imagery prior to displaying the image information 1020.

Figure 11:
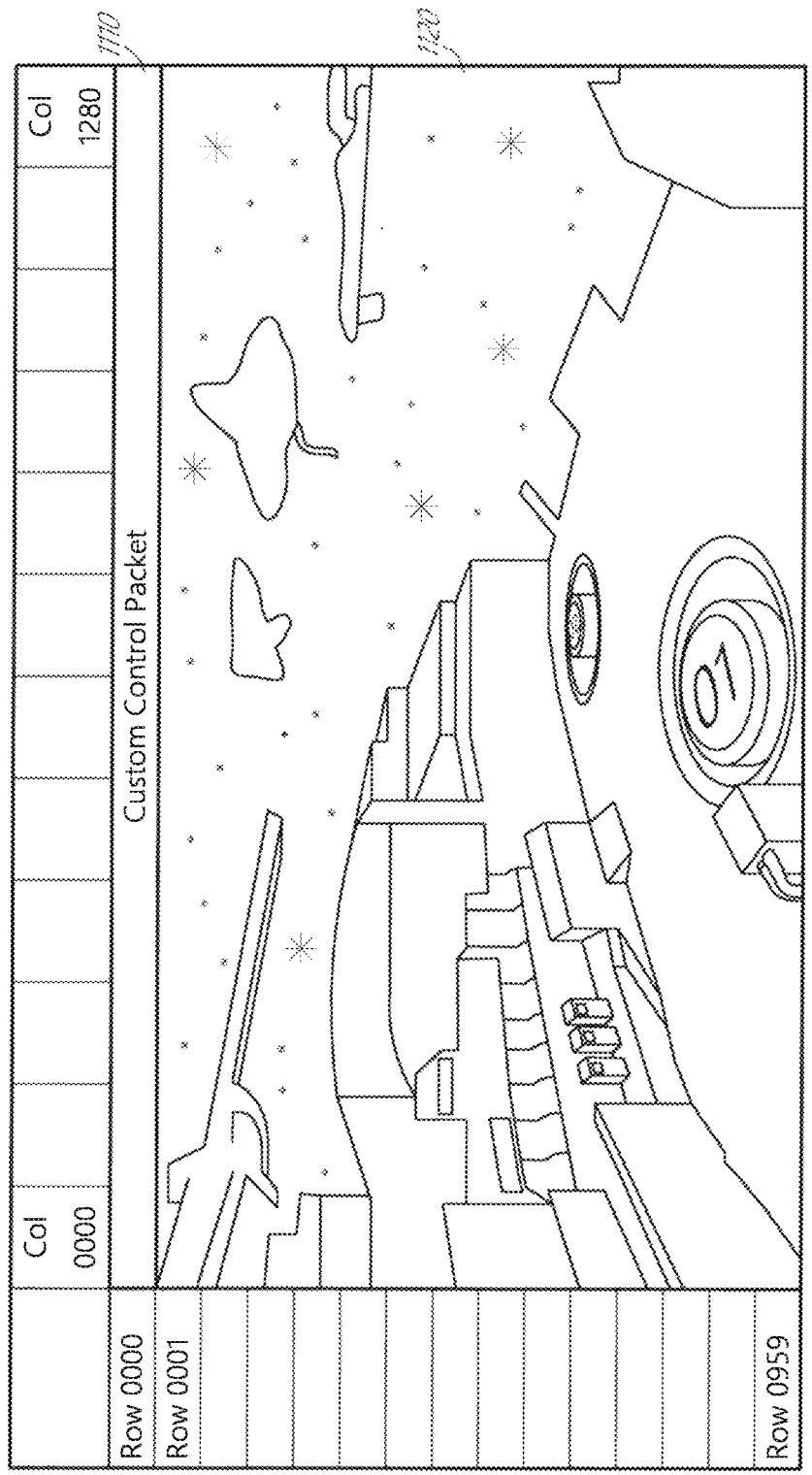
FIG. 11 illustrates another example format for a frame of video data which includes control information.

FIG. 11 illustrates another example format for a frame of video data which includes control information. FIG. 11 is similar to FIG. 10 except that the control information 1110 is inserted in place of the first row of video data rather than being appended to the frame of video data before the first row. Thus, the first row (Row 000) of the frame comprises control information 1110, while the remaining 959 rows comprise image information 1120.

In this example, the host transmits information to the display controller with a resolution of 1280×960. The display controller can use the control information 1110 to configure the image information 1120 sent to the display panel(s). The display controller then transmits the frame of video data illustrated in FIG. 11 to the display panel(s). However, in some embodiments, before transmitting the frame of video data illustrated in FIG. 11 to the display panel(s), the display controller can remove the control information 1110 by, for example, setting that row of the frame of video data to zeros. This causes the first row of each frame of video data to appear as a dark line on the display.

Using the scheme illustrated in FIG. 11, control information 1110 can be included with a frame of video data without changing the resolution of the information sent to the display controller. However, the trade-off in this example is that the effective display resolution is decreased due to the fact that some image information is replaced by the control information. While FIG. 11 illustrates that the control information 1110 is inserted in place of the first row of image information, the control information could alternatively be inserted in place of another row in the frame.

The control information illustrated in, for example, FIGS. 10 and 11 (and later in FIG. 12) can be used for a number of different purposes. For example, the control information can indicate whether a frame of video data should be displayed on the left-eye video panel or the right-eye video panel. The control information can indicate which of a plurality of depth planes the frame of video data corresponds to. The control information can indicate the flashing order for the light field video information. For example, the control information can indicate the order in which to display each depth plane, as well as the order to display the color component sub-frames for each depth plane. In addition, there may be a need to shift pixels left/right or up/down after the content for the display has already been generated by the host. Rather than adjusting and re-rendering the image information, the control information can include pixel shift information which specifies the direction and magnitude of a pixel shift which should be carried out by the display controller.

Such pixel shifts can be carried out for a number of reasons. Pixel shifts can be performed in cases in which the image content needs to be moved on the display due to, for example, a user's head movement. In such cases, the content may be the same but its location within the viewing area on the display may need to be shifted. Rather than re-rendering the image information at the GPU and sending the whole set of pixels to the display controller again, the pixel shift can be applied to the image information using the pixel shift control information. As illustrated in FIGS. 10 and 11, the pixel shift control information can be included at the beginning of a frame. Alternatively, and/or additionally, a late update control packet can be sent within a frame (e.g., after the first row) to perform an appropriate pixel shift based on an updated head pose mid frame. This can be done using, for example, a Mobile Industry Processor Interface (MIPI) Display Serial Interface (DSI) virtual channel.

Pixel shifts can also be performed in cases in which the user is moving his or her head and a more accurate representation of the pixels is wanted. Rather than having the GPU re-render the image information, a late shift on the display can be applied using the pixel shift approach. Any pixel shift described herein could impact a single depth plane or multiple depth planes. As already discussed herein, in some embodiments, there are differences in time between when various depth planes are displayed. During these time differences, the user may shift his or her eyes such that the viewing frustum may need to be shifted. This can be accomplished using a pixel shift for any of the depth planes.

The pixel shift control information can indicate a pixel shift in the X-Y direction within a frame of a single depth plane. Alternately, and/or additionally, the pixel shift control information can indicate a shift in the Z direction between depth plane buffers. For example, an object that was previously displayed in one or more depth planes may move to another depth plane set with a Z-pixel shift. This type of shift can also include a scaler to enlarge or reduce the partial image for each depth. Assume, for example, that a displayed character is floating between two depth planes and there is no occlusion of that character with another object. Apparent movement of the character in the depth direction can be accomplished by re-drawing the character forward or backward one or more depth planes using the Z-pixel shift and scaler. This can be accomplished without re-rendering the character and sending a frame update to the display controller, resulting in a smoother motion performance at much lower computational cost.

The scaler can also be used to compensate for magnification effects that occur within the display as a result of, for example, the lenses 192, 194, 196, 198. Such lenses may create virtual images which are observable by the user. When a virtual object moves from one depth plane to another, the optical magnification of the virtual image can actually be opposite of what would be expected in the physical world. For example, in the physical world when an object is located at a further depth plane from the viewer, the object appears smaller than it would if located at a closer depth plane. However, when the virtual object moves from a nearer depth plan to a further depth plane in the display, the lenses may actually magnify the virtual image of the object. Thus, in some embodiments, a scaler is used to compensate for optical magnification effects in the display. A scaler can be provided for each depth plane to correct magnification effects caused by the optics. In addition, a scaler can be provided for each color if there are any scaling issues to be addressed on a per color basis.

In some embodiments, the maximum horizontal pixel shift can correspond to the entire panel width, while the maximum vertical pixel shift can correspond to the entire panel height. Both positive and negative shifts can be indicated by the control information. Using this pixel shift information, the display controller can shift a frame of video data left or right, up or down, and forward or backward between depth planes. The pixel shift information can also cause a frame of video data to be completely or partially shifted from the left-eye display panel to the right-eye display panel, or vice versa. Pixel shift information can be included for each of the depth planes in the light field video information.

In some embodiments, such as those where scanning-based displays are used, incremental distributed pixel shifts can be provided. For example, the images for a frame of video can be shifted incrementally in one or more depth planes until reaching the end (e.g., bottom) of the image. The pixels which are displayed first can be shifted more or less than later-displayed pixels within a frame in order to compensate for head movement or in order to simulate motion of the object. Further, there can be an incremental pixel shift on a per-plane basis. For example, pixels in one depth plane can be shifted more or less than pixels in another depth plane. In some embodiments, eye tracking technology is used to determine which portion of a display screen the user is fixated on. Objects in different depth planes, or even at different locations within a single depth plane, can be pixel shifted (or not shifted) depending on where the user is looking. If there are objects that the user is not fixating on, pixel shift information for those objects may be disregarded in order to improve performance for pixel shifts in the imagery that the user is fixating on. Again, an eye tracker can be used to determine where on the display the user is looking.

The control information can also be used to specify and/or regulate one or more virtual depth planes. A virtual depth plane can be provided at a desired interval between two defined depth planes in a virtual or augmented reality system by blending the two depth plane images with appropriate weightings to maintain the desired brightness of the imagery. For example, if a virtual depth plane is desired between depth plane D0 and depth plane D1, then a blending unit can weight the pixel values of the D0 image information by 50% while also weighting the pixel values of the D1 image information by 50%. (So long as the weightings sum to 100%, then the apparent brightness of the imagery can be maintained.) The result would be a virtual depth plane that appears to be located midway between D0 and D1. The apparent depth of the virtual depth plane can be controlled by using different blending weights. For example, if it is desired that the virtual depth plane appear closer to D1 than D0, then the D1 image can be weighted more heavily. One or more scalers can be used to ensure that a virtual object is substantially the same size in both of the depth planes that are being blended so that like portions of the virtual object are combined during the blending operation. The control information can specify when virtual depth plane imagery is to be calculated and the control information can also include blending weights for the virtual depth planes. In various embodiments, the weights can be stored in a programmable look up table (LUT). The control information can be used to select the appropriate weights from the LUT that would provide a desired virtual depth plane.

The control information can also indicate whether image information for one of two stereo displays should be copied into the other. For example, in the case of the most distant simulated depth plane (e.g., background imagery), there may be relatively little difference (e.g., due to parallax shift) between the right and left eye images. In such cases, the control information can indicate that the image information for one of the stereo displays be copied to the other display for one or more depth planes. This can be accomplished without re-rendering the image information at the GPU for both the right and left eye displays or re-transferring image information to the display controller. If there are relatively small differences between the right and left eye images, pixel shifts can also be used to compensate without re-rendering or re-transferring image information for both eyes.

The control information illustrated in FIGS. 10 and 11 can also be used for other purposes besides those specifically enumerated here.

Figure 12:
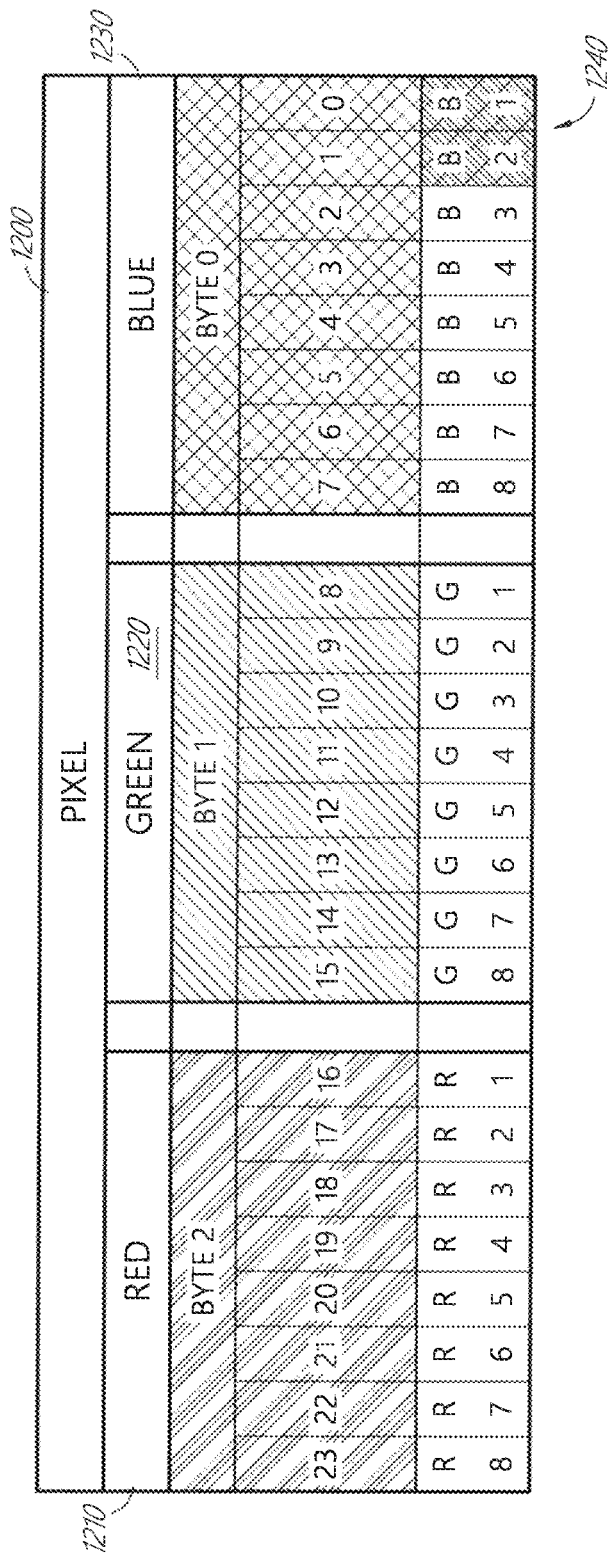
FIG. 12 illustrates an example format for a pixel of video data which includes embedded control information.

While FIGS. 10 and 11 illustrate that rows of control information can be included with/in a frame of video data (e.g., with image information), control information can also (or alternatively) be embedded in individual pixels of video data (e.g., image information). This is illustrated in FIG. 12, which illustrates an example format for a pixel 1200 of video data (e.g., image information) which includes embedded control information 1240. FIG. 12 illustrates that the pixel 1200 comprises a blue value 1230 (Byte 0), a green value 1220 (Byte 1), and a red value 1210 (Byte 2). In this embodiment, each of the color values has a color depth of eight bits. In some embodiments, one or more of the bits corresponding to one or more of the color values can be replaced by control information 1240 at the expense of the bit depth of the color value(s). Thus, control information can be embedded directly in pixels at the expense of dynamic range of the color value(s) for the pixel. For example, as illustrated in FIG. 12, the highlighted two least significant bits of the blue value can be dedicated as the control information 1240. Though not illustrated, bits of the other color values can also be dedicated as control information. Moreover, different numbers of pixel bits can be dedicated as control information.

In some embodiments, the control information 1240 embedded in the pixels can be depth plane indicator information (though the control information embedded in the pixels can also be any other type of control information, including other types described herein). As discussed herein, light field video information can include a number of depth planes. The bit depth for one or more pixels in the video frame can be reduced and the resulting available bit(s) can be used to indicate the depth plane to which a pixel corresponds.

As a concrete example, consider the 24-bit RGB pixel data illustrated in FIG. 12. Each of the red, green, and blue color values has a bit depth of eight bits. As already discussed, the bit depth of one or more of the color components can be sacrificed and replaced by depth plane indicator information. For example, since the eye is less sensitive to blue, the blue component can be represented by six bits (bits B3-B8 in FIG. 12) instead of eight. The resulting extra two bits (bits B1 and B2) can be used to specify which of up to four depth planes that pixel corresponds to. If there are more or fewer depth planes, then a greater or lesser number of color bits can be sacrificed. For example if the bit depth is reduced by one bit, up to two depth planes can be specified. If the bit depth is reduced by three bits, up to eight depth planes can be specified, etc. In this way, the dynamic range of a color value can be traded off for the ability to encode depth plane indicator information directly within the image information itself.

In some embodiments, depth plane indicator information 1240 is encoded in every pixel. In other embodiments, depth plane indicator information 1240 may be encoded in one pixel per frame, or one pixel per line, one pixel per virtual or augmented reality object, etc. In addition, depth plane indicator information 1240 can be encoded in just a single color component, or in multiple color components. Similarly, the technique of encoding depth plane indicator information 1240 directly within image information is not limited solely to color image information. The technique can be practiced in the same way for grayscale images, etc.

FIG. 12 illustrates one technique for encoding depth plane indicator information in image information. Another technique is to employ chroma subsampling and use the resulting available bits as depth plane indicator information. For example, the image information can be represented in YCbCr format, where Y represents the luminance component (which may or may not be gamma corrected), Cb represents a blue-difference chroma component, and Cr represents a red-difference chroma component. Since the eye is less sensitive to chroma resolution than luminance resolution, the chroma information can be provided with a lesser resolution than the luminance information without unduly degrading image quality. In some embodiments, a YCbCr 4:2:2 format is used in which a Y value is provided for each pixel but Cb and Cr values are each only provided for every other pixel in alternating fashion. If a pixel (in the absence of chroma subsampling) normally consists of 24 bits of information (8-bit Y value, 8-bit Cb value, and 8-bit Cr value), then after employing chroma subsampling each pixel will only require 16 bits of information (8-bit Y value and 8-bit Cb or Cr value). The remaining 8 bits can be used as depth plane indicator information. The depth plane indicator information can be used to separate the pixels into the appropriate depth planes to be displayed at the appropriate times.

In both the embodiment illustrated in FIG. 12 and the chroma subsampling embodiment, the depth plane indicator information can specify actual depth planes supported by the virtual or augmented reality system and/or virtual depth planes as discussed herein. If the depth plane indicator information specifies a virtual depth plane, it can also specify the weightings of the depth planes to be blended, as discussed herein.

Figure 13:
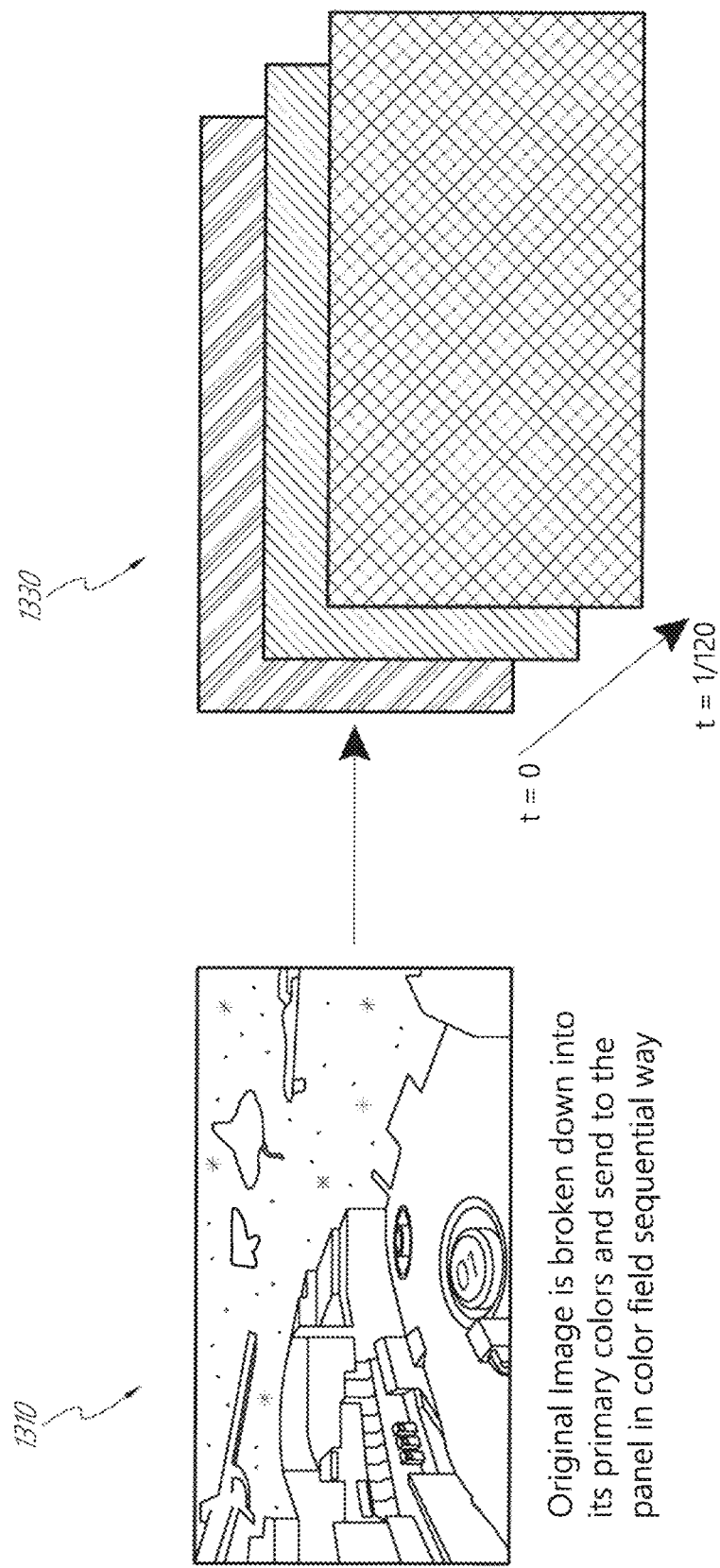
FIG. 13 illustrates how a frame of video can be separated into color components which can be displayed serially.
Figure 14:
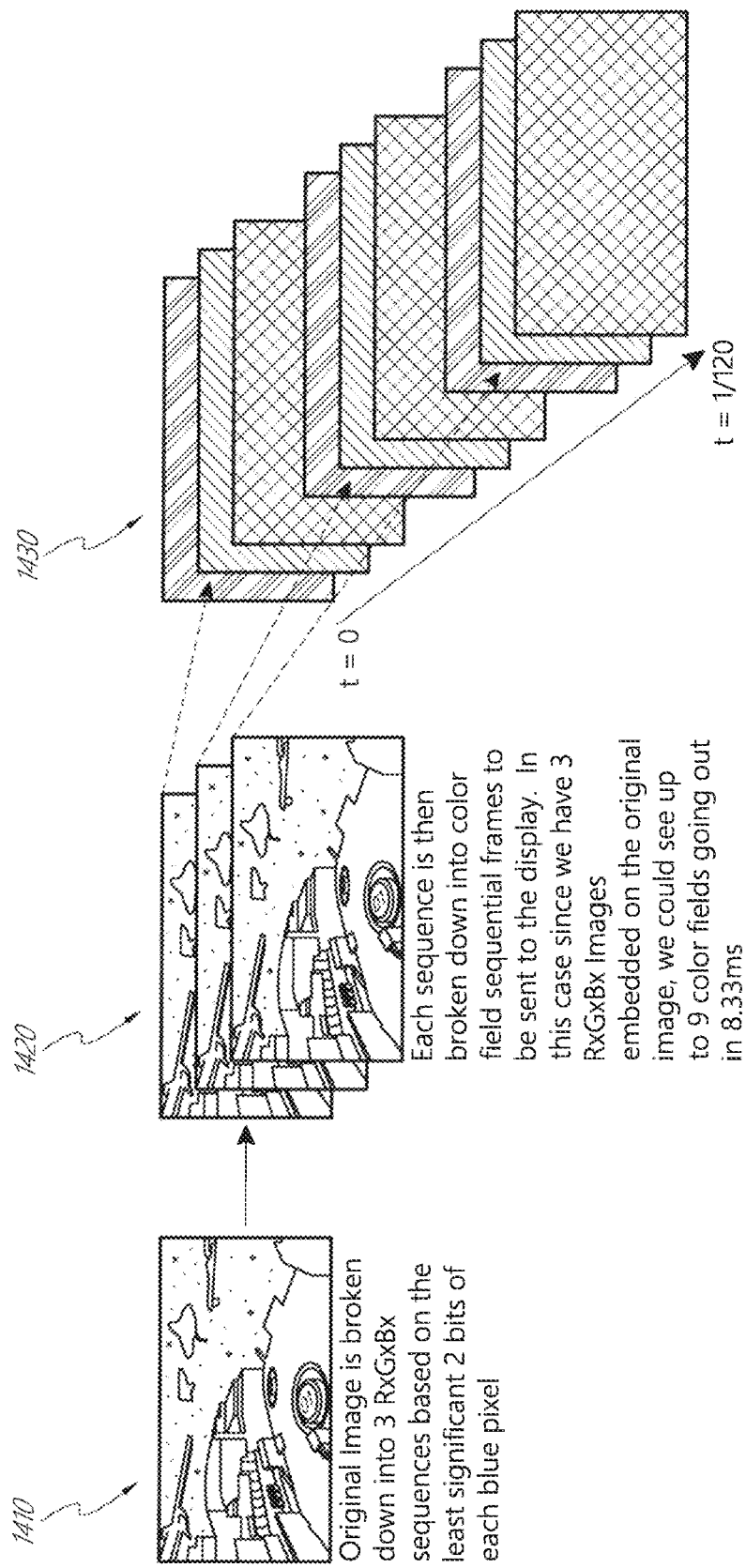
FIG. 14 illustrates how a frame of video data can be separated, using depth plane indicator information, into multiple depth planes which can each be split into color components sub-frames for display.

The usage of the embedded depth plane indicator information in the display controller is illustrated in FIG. 14. But first, FIG. 13 is provided by way of background to show the operation of the display controller when only a single depth plane is present. FIG. 13 illustrates how a frame of video can be separated into color components which can be displayed serially. The left-hand panel 1310 of FIG. 13 shows an image which comprises one frame of a 120 frame per second video. As indicated by the right-hand panel 1330 of FIG. 13, the image is separated into red, green, and blue color components which are flashed on the display by the display controller over the course of ¹⁄₁₂₀ of a second (8.33 ms). For simplicity, FIG. 13 shows that each of the color components is flashed once and that each of the color components is active for the same amount of time. The human vision system then fuses the individual color component sub-frames into the original color image shown in the left-hand panel of FIG. 13. FIG. 14 shows how this process can be adapted when each frame of video data includes multiple depth planes.

FIG. 14 illustrates how a frame of video data can be separated, using depth plane indicator information, into multiple depth planes which can each be split into color components sub-frames for display. In some embodiments, a host transmits a stream of video data to a display controller. This stream of video data is represented by the image in the left-hand panel 1410 of FIG. 14. The display controller can use embedded depth plane indicator information 1240 to separate the stream of video data into a plurality of RxGxBx sequences, where a R0G0B0 sequence corresponds to a first depth plane, a R1G1B1 sequence corresponds to a second depth plane, and a R2G2B2 sequence corresponds to a third depth plane. As illustrated in FIG. 13, this depth plane separation can be performed on the basis of the two least significant blue bits in each pixel. The result is shown in the middle panel 1420 of FIG. 14, which shows three separate depth plane images. Finally, each of the three separate depth plane images shown in the middle panel 1420 of FIG. 14 can be separated into its constituent color component sub-frames. The color component sub-frames of each depth plane can then be sequentially flashed to the display, as illustrated by the right-hand panel 1430 of FIG. 14. The sequence order can be, for example, R0G0B0R1G1B1R2G2B2 as illustrated in FIG. 14, or G0R0B0G1R1B1G2R2B2 as illustrated in FIG. 9.

The depth plane indicator information 1240 can be used by the display controller to determine the number of RxGxBx sequences to use and which pixels correspond to which sequence. Control information can also be provided to specify the order of RxGxBx color sequences that are flashed to the display. For example, in the case of video data which includes three depth planes (D0, D1, D2), there are six possible orders in which the individual RxGxBx sequences can be flashed to the display panel: D0, D1, D2; D0, D2, D1; D1, D0, D2; D1, D2, D0; D2, D0, D1; and D2, D1, D0. If the order specified by the control information is D0, D1, D2, then pixels with blue LSB bits 0b00 corresponding to the first depth plane, D0, can be selected as the first RxGxBx color sequence image going out. Pixels with blue LSB bits 0b01 corresponding to the second depth plane, D1, can be selected as the second RxGxBx color sequence image going out, and so on.

Figure 15:
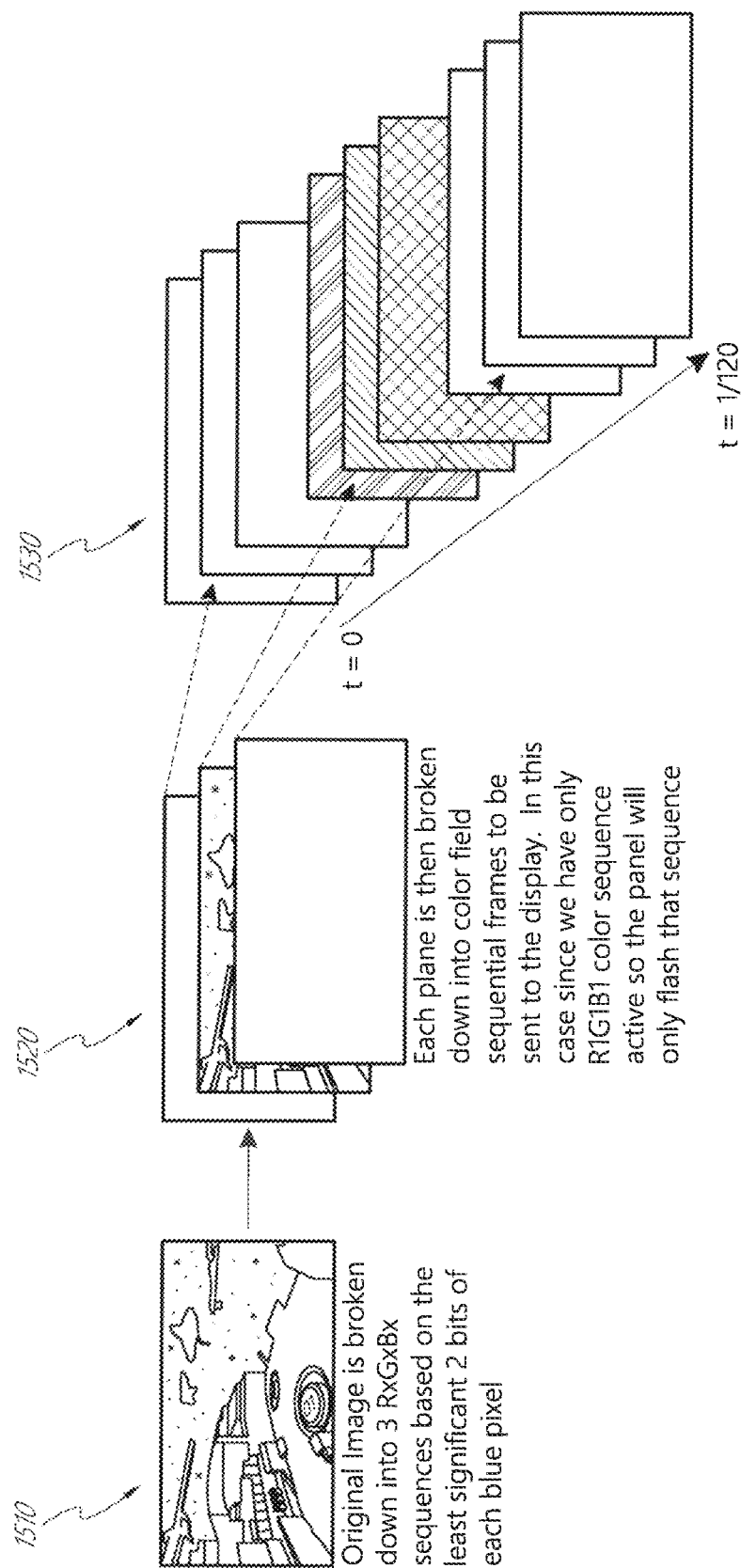
FIG. 15 illustrates an example where the depth plane indicator information of FIG. 12 indicates that one or more depth planes of a frame of video data are inactive.

FIG. 15 illustrates an example where the depth plane indicator information of FIG. 12 indicates that one or more depth planes of a frame of video data are inactive. FIG. 15 is similar to FIG. 14 in that it shows a stream of video data (represented by the left-hand panel 1510 of FIG. 15) being separated into depth planes (represented by the middle panel 1520 of FIG. 15), which are then each separated into color component sub-frames (represented by the right-hand panel 1530 of FIG. 15). However, FIG. 15 is distinct from FIG. 14 in that only a single depth plane is shown as being active.

As already discussed, the depth plane indicator information 1240 in FIG. 12 comprises the two least significant bits of the blue value in each pixel. These two bits are capable of specifying up to four depth planes. However, the video data may include fewer than four depth planes. For instance, in the preceding example, the video data includes only three depth planes. In such cases where the video data includes fewer than the maximum number of specifiable depth planes, the depth plane indicator information can specify that one or more depth planes are inactive. For example, continuing with the preceding example, if the two blue LSB bits in a pixel are set to 0b11, then the pixel can be assigned to an inactive fourth depth plane D3. As shown in FIG. 15, only one of three RxGxBx color sequences is activated in the output sequence; the inactive depth planes are shown as black frames. As before, control information can be provided to specify the order in which depth planes are displayed. As shown in the middle panel 1520 of FIG. 15, in the illustrated example, the control information has specified that the inactive depth plane D3 be shown first and last in the sequence. Thus, only the middle frame in the sequence comprises image information which is flashed to the display. (Other sequences can also be used. For example, the active depth plane could be ordered first or last in the sequence, or it could be repeated in the sequence more than once.) When the display controller sees that a pixel is assigned to an inactive depth plane, then the display controller can simply disregard the pixel and not flash it to the display.

For example, when the control information indicates that one or more frames, one or more depth planes, and/or one or more color fields are/is inactive, power to the light source(s) that provides light to the display for the one or more particular frames, the one or more particular depth planes, and/or the one or more particular color fields can be reduced (e.g., entering a reduced power state or shut off completely), thereby reducing net power consumption of the system. This can save switching power at the display driver. Thus, a power-saving mode can be implemented by designating one or more frames, one or more depth planes, and/or one or more color fields of the video data as inactive. For example, in some embodiments, the control information can indicate that one or more color fields is inactive within a depth plane, while one or more other color fields in the depth plane are active. Based on this control information, the display controller can control the display to disregard the color field or fields that are inactive and display the imagery from the one or more active color fields without the inactive color field(s). For example, when the control information indicates that a color field is inactive, power to the light source(s) that provides light to the display for that particular color field can be reduced (e.g., entering a reduced power state or shut off completely), thereby reducing net power consumption of the system. Accordingly, light sources, such as light emitting diodes (LEDs), lasers, etc., that provide illumination to the display can be shut off or have their power reduced for inactive frames, inactive depth planes, and/or inactive color fields.

In some embodiments, reduced power rendering may be preferred over a complete shut off, to enable faster activation of the light source when desired. As used herein, a reactivation period may refer to a time for a light source to go from a completely "off" state to peak potential intensity. In some embodiments, light sources may have a comparatively long reactivation period requiring longer periods to reach peak potential intensity from a completely "off" state as compared to alternative light sources. Such light sources may be placed in a reduced power state to achieve reduced power consumption. In the reduced power state, the light sources may not be shut off completely. In some embodiments, light sources may have a comparatively short reactivation period requiring shorter periods to reach peak intensity from a completely "off" state as compared to alternative light sources. Such light sources may be shut off completely to achieve reduced net power consumption. For example, some light sources (e.g., light emitting diodes (LEDs), organic light emitting diodes (OLEDs), lasers, etc.) may be shut off completely to achieve reduced net power consumption, as their reactivation period is comparatively short (e.g., after controlling for signal transmission speeds of a particular architecture, the speed of light), whereas other light sources (e.g., arc lamps, fluorescent lamps, backlit liquid crystal displays (LCD)) may be placed in a reduced power state as their reactivation period is comparatively long and require longer periods to reach peak potential intensity from a completely "off" state.

In some embodiments, control information comprises advance frame display information, for example, as a function of the frame rate of an image relative to a given light source, or motion of a user's perspective. The advance frame display information may include information regarding when a one or more depth planes of a plurality of depth planes and/or when one or more color fields of the one or more depth planes of the plurality of depth planes is, or is anticipated, to be active or inactive. For example, advance frame display information may include information indicating a particular color field of a particular depth plane, for a frame subsequent to the current frame, needs to be active N (e.g., 5) frames later. Such determination may be content driven (such as a constant user head pose or rendering perspective), or user driven (such as a user changing a field of view and the display needs for rendering). For example, in systems employing light sources having a short (nearly instantaneous) reactivation period, such as LEDs, OLEDs, lasers, and the like, no advance frame display information may be embedded in the control information as the light source may be activated to full intensity instantly. In systems employing light sources having a long reactivation period, such as arc lamps, fluorescent lamps, backlit LCDs, and the like, advance frame display information may be embedded in the control information, the advance frame display information indicating when to begin supplying power, for example, full power or increased power, to a light source resulting in optimal illumination for a particular subsequent frame.

Figure 20:
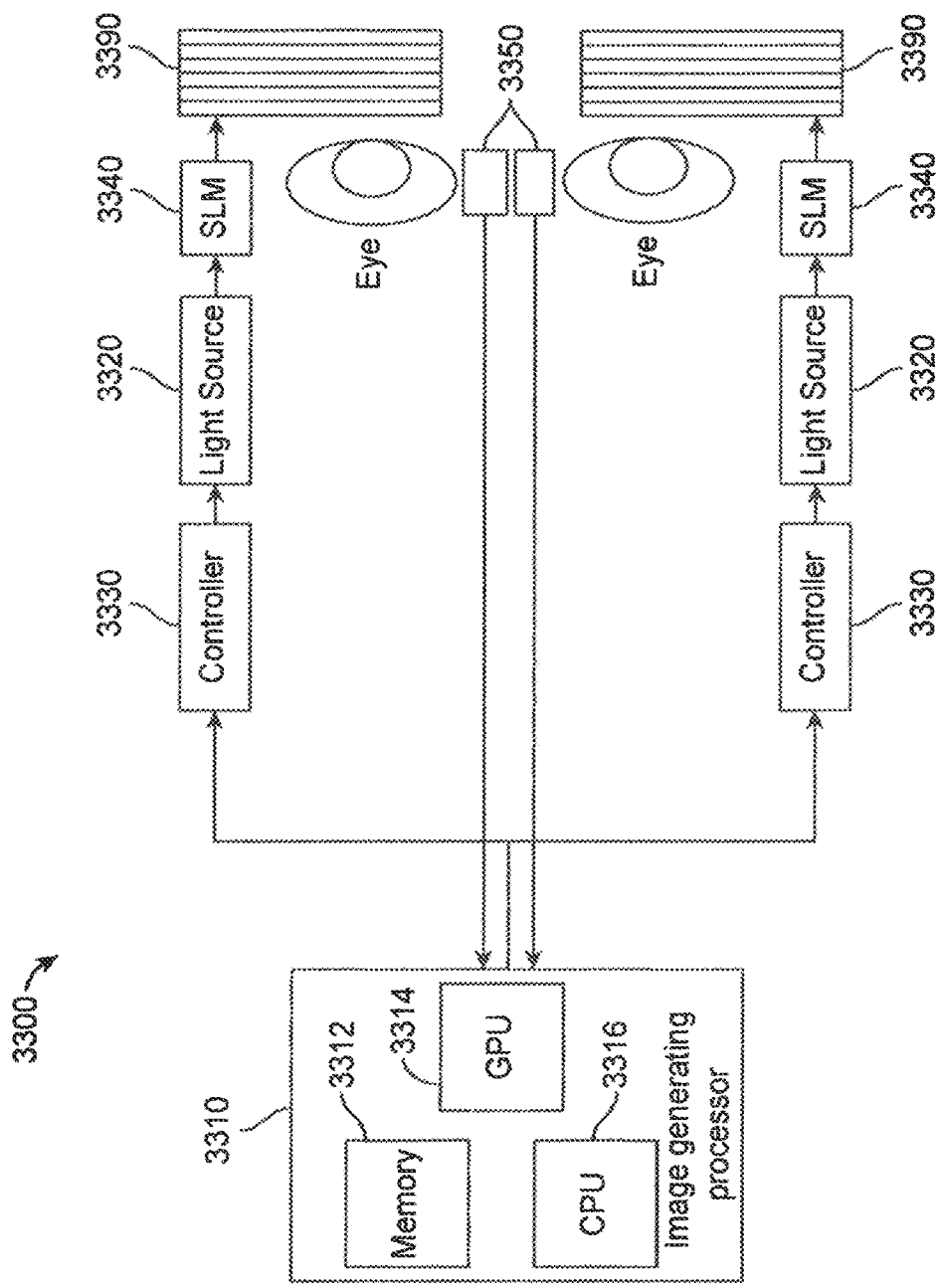
FIG. 20 is a block diagram depicting an AR/MR system, according to one embodiment.

Similarly, in some embodiments, power supplied to a spatial light modulator (SLM) conveying light source illumination may be reduced in power as a function of control information. As depicted in FIG. 20, projector architecture to deliver an image to a user comprises light sources 3320 and spatial light modulator 3340 (for example, a Liquid Crystal on Silicon, LCOS, or other microdisplay). As described above, when the control information indicates one or more frames, one or more depth planes, and/or one or more color fields are/is inactive, power to the light source(s) that provides light to the display for the one or more particular frames, the one or more particular depth planes, and/or the one or more color fields can be reduced (e.g., entering a reduced power state or shut off completely), and power to the SLM can be reduced (e.g., entering a reduced power state or shut off completely) for periods corresponding to when the one or more frames, the one or more depth planes, and/or the one or more color fields are inactive. In some embodiments, rendering by a graphics processing unit or other rendering engine may still occur, but no images are displayed (for example, a user's current head pose or field of view does not include content that otherwise is still active and will be rendered upon the user moving to the appropriate head pose or field of view).

In some embodiments, a display controller may simultaneously deliver one or two inputs to the display among a plurality of possible inputs, the first being an inactivation or reduced power setting to a particular component for a current frame (e.g., to occur at a first time, t=0), and the second being an activation or increased power setting to a particular component for a second frame (e.g., to occur at a second time, t=0+N).

Multi-Depth Plane Image Compression

In some embodiments, image compression techniques are applied across multiple depth planes in order to reduce the amount of video image information by removing redundancy of information between depth planes. For example, rather than transmitting an entire frame of image information for each depth plane, some or all of the depth planes may instead be represented in terms of changes with respect to an adjacent depth plane. (This can also be done on a temporal basis between frames at adjacent instants in time.) The compression technique can be lossless or it can be lossy, such that changes between adjacent depth plane frames, or between temporally-adjacent frames, which are less than a given threshold can be ignored, thus resulting in a reduction in image information. In addition, the compression algorithms can encode motion of objects within a single depth plane (X-Y motion) and/or between depth planes (Z motion) using motion vectors. Rather than requiring that image information for a moving object be repeatedly transmitted over time, motion of the object can be achieved entirely or partially with pixel shift control information, as discussed herein.

Dynamically Configurable Display Drawing Areas

In systems that display light field imagery, it can be challenging to achieve high video frame rates owing to the relatively large amount of information (e.g., multiple depth planes, each with multiple color components) included for each video frame. However, video frame rates can be improved, particularly in augmented reality mode, by recognizing that computer-generated light field imagery may only occupy a fraction of the display at a time, as shown in FIG. 16.

Figure 1:
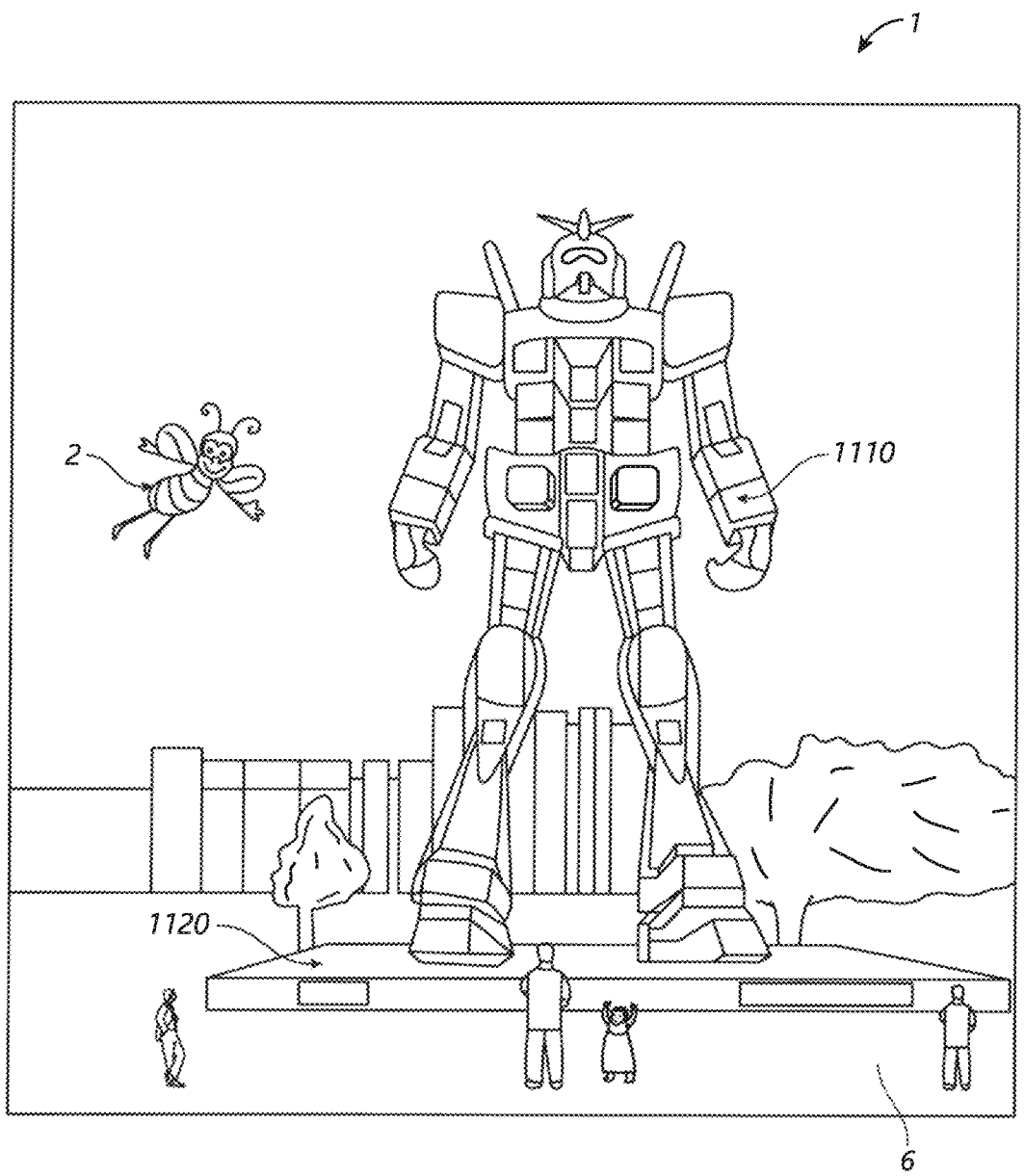
FIG. 1 illustrates a user's view of an augmented reality (AR) scene using an example AR system.
Figure 16:
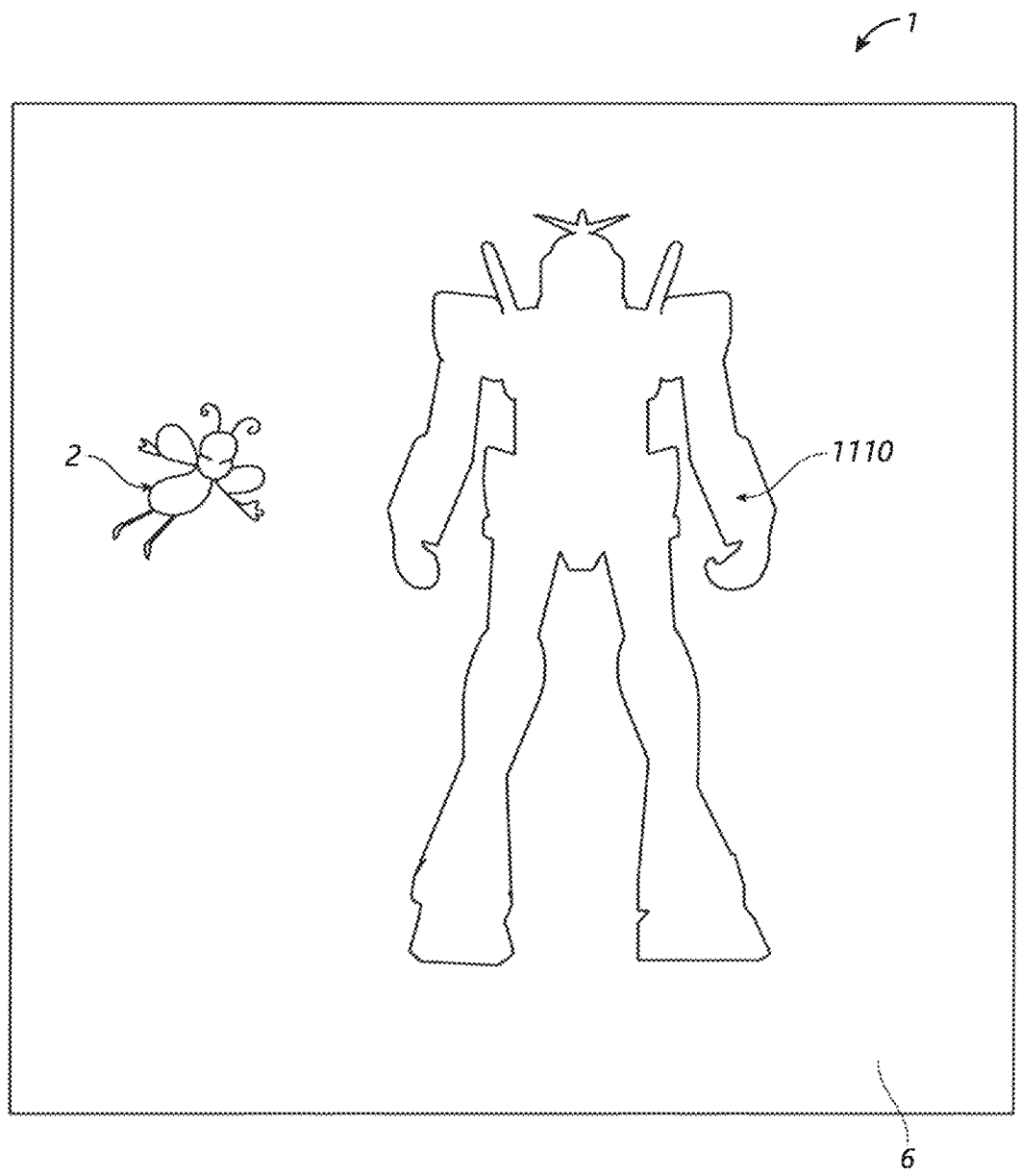
FIG. 16 illustrates example drawing areas for a frame of computer-generated imagery in an augmented reality system.

FIG. 16 illustrates example drawing areas for a frame of computer-generated imagery in an augmented reality system. FIG. 16 is similar to FIG. 1 except that it shows only the portions of the display where augmented reality imagery is to be drawn. In this case, the augmented reality imagery includes the robot statue 1110 and the bumblebee character 2. The remaining area of the display in augmented reality mode may simply be a view of the real-world environment surrounding the user. As such, there may be no need to draw computer-generated imagery in those areas of the display. It may often be the case that the computer-generated imagery occupies only a relatively small fraction of the display area at a time. By dynamically re-configuring the specific drawing area(s) which are refreshed from frame-to-frame so as to exclude areas where no computer-generated imagery need be shown, video frame rates can be improved.

Computer-generated augmented reality imagery may be represented as a plurality of pixels, each having, for example, an associated brightness and color. A frame of video data may comprise an m×n array of such pixels, where m represents a number of rows and n represents a number of columns. In some embodiments, the display of an augmented reality system is at least partially transparent so as to be capable of providing a view of the user's real-world surroundings in addition to showing the computer-generated imagery. If the brightness of a given pixel in the computer-generated imagery is set to zero or a relatively low value, then the viewer will see the real-world environment at that pixel location. Alternatively, if the brightness of a given pixel is set to a higher value, then the viewer will see computer-generated imagery at that pixel location. For any given frame of augmented reality imagery, the brightness of many of the pixels may fall below a specified threshold such that they need not be shown on the display. Rather than refresh the display for each of these below-threshold pixels, the display can be dynamically configured not to refresh those pixels.

In some embodiments, the augmented reality system includes a display controller for controlling the display. The controller can dynamically configure the drawing area for the display. For example, the controller can dynamically configure which of the pixels in a frame of video data are refreshed during any given refresh cycle. In some embodiments, the controller can receive computer-generated image information corresponding to a first frame of video. As discussed herein, the computer-generated imagery may include several depth planes. Based on the image information for the first frame of video, the controller can dynamically determine which of the display pixels to refresh for each of the depth planes. If, for example, the display utilizes a scanning-type display technology, the controller can dynamically adjust the scanning pattern so as to skip areas where the augmented reality imagery need not be refreshed (e.g., areas of the frame where there is no augmented reality imagery or the brightness of the augmented reality imagery falls below a specified threshold).

In this way, based upon each frame of video data that is received, the controller can identify a sub-portion of the display where augmented reality imagery should be shown. Each such sub-portion may include a single contiguous area or multiple non-contiguous areas (as shown in FIG. 16) on the display. Such sub-portions of the display can be determined for each of the depth planes in the light field image information. The display controller can then cause the display to only refresh the identified sub-portion(s) of the display for that particular frame of video. This process can be performed for each frame of video. In some embodiments, the controller dynamically adjusts the areas of the display which will be refreshed at the beginning of each frame of video data.

If the controller determines that the area of the display which should be refreshed is becoming smaller over time, then the controller may increase the video frame rate because less time will be needed to draw each frame of augmented reality data. Alternatively, if the controller determines that the area of the display which should be refreshed is becoming larger over time, then it can decrease the video frame rate to allow sufficient time to draw each frame of augmented reality data. The change in the video frame rate may be inversely proportional to the fraction of the display that needs to be filled with imagery. For example, the controller can increase the frame rate by 10 times if only one tenth of the display needs to be filled.

Such video frame rate adjustments can be performed on a frame-by-frame basis. Alternatively, such video frame rate adjustments can be performed at specified time intervals or when the size of the sub-portion of the display to be refreshed increases or decreases by a specified amount. In some cases, depending upon the particular display technology, the controller may also adjust the resolution of the augmented reality imagery shown on the display. For example, if the size of the augmented reality imagery on the display is relatively small, then the controller can cause the imagery to be displayed with increased resolution. Conversely, if the size of the augmented reality imagery on the display is relatively large, then the controller can cause imagery to be displayed with decreased resolution.

Enhanced Head Pose Estimation

As discussed herein, virtual and augmented reality systems can include body-mounted displays, such as a helmet, glasses, goggles, etc. In addition, virtual augmented reality systems can include sensors such as gyroscopes, accelerometers, etc. which perform measurements that can be used to estimate and track the position, orientation, velocity, and/or acceleration of the user's head in three dimensions. The sensors can be provided in an inertial measurement unit worn by the user on his or her head. In this way, the user's head pose can be estimated. Head pose estimates can be used as a means of allowing the user to interact with the virtual or augmented reality scene. For example, if the user turns or tilts his or her head, then the virtual or augmented reality scene can be adjusted in a corresponding manner (e.g., the field of view of the scene can be shifted or tilted).

Figure 17:
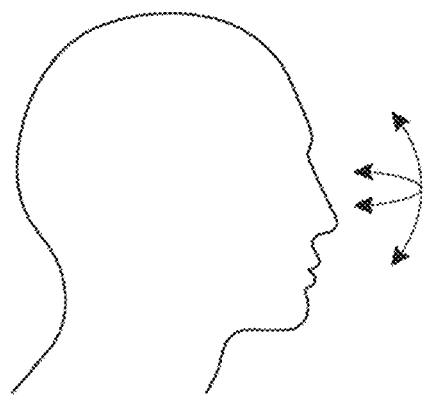
FIG. 17 schematically illustrates the possible motion of a user's head about two rotational axes.
Figure 18:
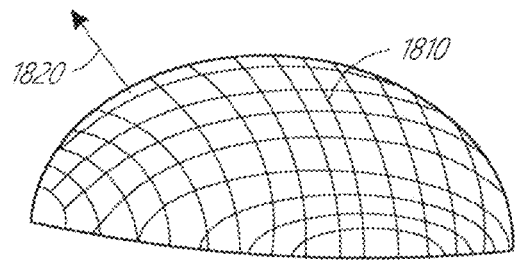
FIG. 18 illustrates how a user's head pose can be mapped onto a three-dimensional surface.

FIG. 17 schematically illustrates the possible motion of a user's head about two rotational axes. As illustrated, the user can rotate his or her head about a vertical axis and a horizontal axis perpendicular to the page. Though not illustrated, the user can also rotate his or her head about a horizontal axis that lies in the plane of the page. In some embodiments, it may be useful to define the direction of the user's line of sight as the head pose direction. (Although such a definition of head pose would not necessarily account for the side tilt of the head, other definitions of head pose could.) FIG. 18 illustrates how a user's head pose can be mapped onto a three-dimensional surface 1810. FIG. 18 includes a surface normal vector 1820 which indicates the user's head pose. Each possible surface normal vector 1820 on the three-dimensional surface corresponds to a distinct head pose. In FIG. 18, a surface normal vector pointing directly up would correspond to the user's neutral head pose when he or she is looking directly forward.

Various algorithms can be used to estimate and track the user's head pose based on the sensor measurements from the head-mounted inertial measurement unit. These include, for example, Kalman filters and other similar algorithms. These types of algorithms typically produce estimates which are based on sensor measurements over time rather than solely at any single instant. A Kalman filter, for example, includes a prediction phase where the filter outputs a predicted estimate of the head pose based on the head pose estimate at the previous instant. Next, during an update phase, the filter updates the head pose estimate based on current sensor measurements. Such algorithms can improve the accuracy of head pose estimates, which reduces error in displaying virtual or augmented reality imagery appropriately in response to head movements. Accurate head pose estimates can also reduce latency in the system.

Typically, a Kalman filter or similar algorithm produces the most accurate head pose estimates for head poses near the user's neutral head pose (corresponding to a vertical surface normal vector 1820 in FIG. 18). Unfortunately, such algorithms may fail to properly estimate head pose movement as the head pose deviates further from the neutral head pose because they do not account for movement limits imposed by human physiology or the movement of the user's head in relation to the body. However, various adaptations can be made in order to reduce the effects of these weaknesses on head pose tracking.

In some embodiments, head pose estimation and tracking using Kalman filters or similar algorithms can be improved by using variable gain factors which are different depending upon the current head pose location within an envelope of physiologically-possible head poses. FIG. 18 illustrates a three-dimensional surface 1810 corresponding to such an envelope of physiologically-possible head poses. FIG. 18 shows that the user's head has a range of motion in any direction of no more than about 180° (e.g., side to side or up and down). The current head pose within the physiological envelope can be used to adjust the Kalman filter estimated variable gain factors. In areas near the center of the envelope (i.e., neutral head pose), the gain factors can be set to emphasize the predicted head pose over the measured head pose because the Kalman filter prediction errors can be lower due to the higher linearity of the head movement in this region. This can reduce latency in the system without unduly impacting head pose estimation accuracy. When the head pose approaches the physiological head movement envelope boundaries, then the algorithm can use gain factors which are set to reduce the filter's reliance on predicted head pose or emphasize the measured head pose over the predicted head pose in order to reduce error.

In some embodiments, each location on the physiological head pose envelope illustrated in FIG. 18 can correspond to different gains. In other embodiments, the physiological head pose envelope can be split into separate regions and different gain values can be associated with each of the different regions. This is illustrated in FIG. 19.

Figure 19:
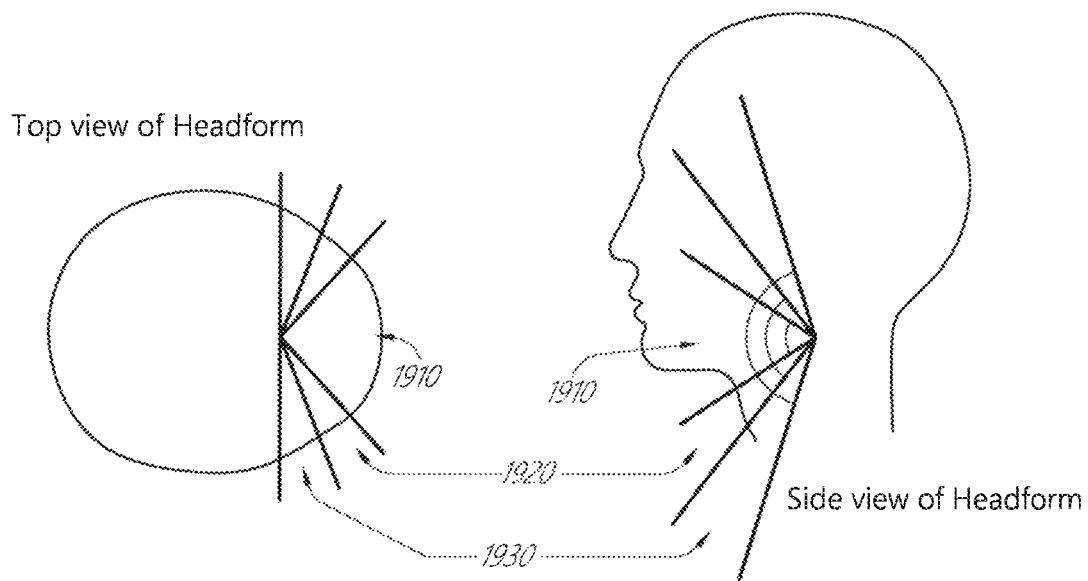
FIG. 19 schematically illustrates various head pose regions which can be used to define gain factors for improving head pose tracking.

FIG. 19 schematically illustrates various head pose regions which can be used to define gain factors for improving head pose tracking. FIG. 19 shows a central region 1910 corresponding to relatively neutral head poses. It also includes an outer region 1930 corresponding to head poses near the physiological boundary and an intermediate region 1920 in between the central and outer regions. In some embodiments, a different set of gain factors can be specified for each head pose region. The central region 1910 shows the areas with the higher linearity of movement which will have higher accuracy prediction values produced by a Kalman filter algorithm. When the head pose is within the central region 1910, the gain factors of the Kalman filter can be set to emphasize the predicted head pose over the measured head pose or to otherwise reduce reliance on measured head pose. As the head pose exits the central region and enters the intermediate or outer regions (1920, 1930, respectively), the movement can become more constrained by physiological factors that will adversely impact the Kalman predicted head pose if not taken into account by the algorithm. Accordingly, in these regions (particularly the outer region 1930), the Kalman filter gain values can be set to reduce the filter's reliance on predicted head pose and increase its reliance on measured head pose. For example, it would be inaccurate to strongly rely on a predicted head pose too far into the future if it is known that the acceleration of the head will come to a stop close to the envelope boundaries. Although three head pose regions are illustrated in FIG. 19, a different number of head pose regions can be used in other embodiments.

In some embodiments, head pose estimation and tracking can also be improved by sensing the position, orientation, velocity, and/or acceleration of the user's head relative to the user's body rather than sensing the movement of the head in an absolute sense. This can be done by providing an additional inertial measurement unit worn by the user on his or her body (e.g., on the torso or waist). It is important to note that head pose is a function of both head and body movement. The envelope of physiologically-possible head poses is not fixed in space; it moves with, for example, body rotation. If the user were sitting in a chair moving his or her head while keeping the body immobilized, then the physiological envelope would be relatively constrained such that relatively good head pose estimates could be achieved by considering only the head movement. However, when a user is actually wearing a virtual or augmented reality head-mounted display and moving around, then the physiological envelope of possible head poses varies with body movement.

A second inertial measurement unit worn on the body (e.g., mounted with the battery pack and/or processor for the virtual or augmented reality system) can help provide additional information to track the movement of the physiological envelope of head poses. Instead of fixing the envelope in space, the second inertial measurement unit can allow for movement of the head to be determined in relation to the body. For example, if the body rotates to the right, then the physiological envelope can be correspondingly rotated to the right to more accurately determine the head pose within the physiological envelope and avoid unduly constraining the operation of the Kalman filter.

In some embodiments, the motion of the head determined using the head-mounted inertial measurement unit can be subtracted from the motion of the body determined using the body-mounted inertial measurement unit. For example, the absolute position, orientation, velocity, and/or acceleration of the body can be subtracted from the absolute position, orientation, velocity, and/or acceleration of the head in order to estimate the position, orientation, velocity, and/or acceleration of the head in relation to the body. Once the orientation or motion of the head in relation to the body is known, then the actual head pose location within the physiological envelope can be more accurately estimated. As discussed herein, this allows Kalman filter gain factors to be determined in order to improve estimation and tracking of the head pose.

Enhanced "Totem" Position Estimation

In some virtual or augmented reality systems, a specified tangible object can be used as a "totem" which allows a user to interact with a virtual object or scene. For example, a tangible block which the user holds in his or her hand could be recognized by the system as an interactive device, such as a computer mouse. The system can include, for example, a camera which tracks the movement of the tangible block in the user's hand and then accordingly adjusts a virtual pointer. A possible drawback of using computer vision for tracking totems in space is that the totems may occasionally be outside the field of view of the camera or otherwise obscured. Thus, it would be beneficial to provide a system for robustly tracking the position and motion of the totem in three dimensions with six degrees of freedom.

In some embodiments, a system for tracking the position and motion of the totem includes one or more sensors in the totem. These one or more sensors could be accelerometers and/or gyroscopes which independently determine the position and movement of the totem in space. This data can then be transmitted to the virtual or augmented reality system.

Alternatively, the one or more sensors in the totem can work in conjunction with a transmitter to determine the position and movement of the totem and space. For example, the transmitter can create spatially-varying electric and/or magnetic fields in space and the totem can include one or more sensors which repeatedly measure the field at the location of the totem, thereby allowing the position and motion of the totem to be determined. In some embodiments, such a transmitter can advantageously be incorporated into the head-mounted display of the virtual or augmented reality system. Alternatively, the transmitter could be incorporated into a body-mounted pack. In this way, the location and/or movement of the totem with respect to the head or body, respectively, of the user can be determined. This may be more useful information than if the transmitter were simply located at a fixed location (e.g., on a nearby table) because the location and/or movement of the totem can be determined in relation to the head or body of the user.

Adjustment of Imagery Colors Based on Ambient Lighting

In some embodiments, the virtual and augmented reality systems described herein include one or more sensors (e.g., a camera) to detect the brightness and/or hue of the ambient lighting. Such sensors can be included, for example, in a display helmet of the virtual or augmented reality system. The sensed information regarding the ambient lighting can then be used to adjust the brightness or hue of generated pixels for virtual objects. For example, if the ambient lighting has a yellowish cast, computer-generated virtual objects can be altered to have yellowish color tones which more closely match those of the real objects in the room. Such pixel adjustments can be made at the time an image is rendered by the GPU. Alternatively, and/or additionally, such pixel adjustments can be made after rendering by using the control information discussed herein.

AR/MR System

Referring now to FIG. 20, an exemplary embodiment of an AR or MR system 3300 (hereinafter referred to as "system 3300") is illustrated. The system 3300 uses stacked light guiding optical element (hereinafter referred to as "LOEs 3390"). The system 3300 generally includes an image generating processor 3310, a light source 3320, a controller 3330, a spatial light modulator ("SLM") 3340, and at least one set of stacked LOEs 3390 that functions as a multiple plane focus system. The system 3300 may also include an eye-tracking subsystem 3350. It should be appreciated that other embodiments may have multiple sets of stacked LOEs 3390.

The image generating processor 3310 is configured to generate virtual content to be displayed to a user. The image generating processor 3310 may convert an image or video associated with virtual content to a format that can be projected to the user. For example, in generating virtual content, the virtual content may need to be formatted such that portions of a particular image are displayed at a particular depth plane while others are displayed at other depth planes. In one embodiment, all of the image may be generated at a particular depth plane. In another embodiment, the image generating processor 3310 may be programmed to provide slightly different images to the right and left eyes such that when viewed together, the virtual content appears coherent and comfortable to the user's eyes.

The image generating processor 3310 may further include a memory 3312, a GPU 3314, a CPU 3316, and other circuitry for image generation and processing. The image generating processor 3310 may be programmed with the desired virtual content to be presented to the user of the system 3300. It should be appreciated that in some embodiments, the image generating processor 3310 may be housed in the system 3300. In other embodiments, the image generating processor 3310 and other circuitry may be housed in a belt pack that is coupled to the system 3300.

The image generating processor 3310 is operatively coupled to the light source 3320 which projects light associated with the desired virtual content and one or more SLMs 3340. The light source 3320 is compact and has high resolution. The light source 3320 is operatively coupled to a controller 3330. The light source 3320 may be include color specific LEDs and lasers disposed in various geometric configurations. Alternatively, the light source 3320 may include LEDs or lasers of like color, each one linked to a specific region of the field of view of the display. In another embodiment, the light source 3320 may include a broad-area emitter such as an incandescent or fluorescent lamp with a mask overlay for segmentation of emission areas and positions. Although the light source 3320 is directly connected to the system 3300 in FIG. 20, the light source 3320 may be connected to the system 3300 via optical fibers (not shown). The system 3300 may also include condenser (not shown) configured to collimate the light from the light source 3320.

The SLM 3340 may be reflective (e.g., a liquid crystal on silicon (LCOS), a ferroelectric liquid crystal on silicon (FLCOS), an OLP dot matrix display (DMD), or a microelectromechanical system (MEMS) mirror system), transmissive (e.g., a liquid crystal display (LCD)) or emissive (e.g., an fiber scan display (FSD) or an organic light emitting diode (OLED)) in various exemplary embodiments. The type of SLM 3340 (e.g., speed, size, etc.) can be selected to improve a creation of a perception. While OLP DMDs operating at higher refresh rates may be easily incorporated into stationary systems 3300, wearable systems 3300 may use DLPs of smaller size and power. The power of the OLP changes how depth planes/focal planes are created. The image generating processor 3310 is operatively coupled to the SLM 3340, which encodes the light from the light source 3320 with the desired virtual content. Light from the light source 3320 may be encoded with the image information when it reflects off of, emits from, or passes through the SLM 3340.

Light from the SLM 3340 is directed to the LOEs 3390 such that light beams encoded with image data for one depth plane and/or color by the SLM 3340 are effectively propagated along a single LOE 3390 for delivery to an eye of a user. Each LOE 3390 is configured to project an image or sub-image that appears to originate from a desired depth plane or FOV angular position onto a user's retina. The light source 3320 and LOEs 3390 can therefore selectively project images (synchronously encoded by the SLM 3340 under the control of controller 3330) that appear to originate from various depth planes or positions in space. By sequentially projecting images using each of the light source 3320 and LOEs 3390 at a sufficiently high frame rate (e.g., 360 Hz for six depth planes at an effective full-volume frame rate of 60 Hz), the system 3300 can generate a 3D image of virtual objects at various depth planes that appear to exist simultaneously in the 3D image.

The controller 3330 is in communication with and operatively coupled to the image generating processor 3310, the light source 3320 and the SLM 3340 to coordinate the synchronous display of images by instructing the SLM 3340 to encode the light beams from the light source 3320 with appropriate image information from the image generating processor 3310.

The system 3300 also includes an optional eye-tracking subsystem 3350 that is configured to track the user's eyes and determine the user's focus. In one embodiment, the system 3300 is configured to illuminate a subset of LOEs 3390, based on input from the eye-tracking subsystem 3350 such that the image is generated at a desired depth plane that coincides with the user's focus/accommodation. For example, if the user's eyes are parallel to each other, the system 3300 may illuminate the LOE 3390 that is configured to deliver collimated light to the user's eyes, such that the image appears to originate from optical infinity. In another example, if the eye-tracking subsystem 3350 determines that the user's focus is at 1 meter away, the LOE 3390 that is configured to focus approximately within that range may be illuminated instead.

For purposes of summarizing the disclosure, certain aspects, advantages and features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Embodiments have been described in connection with the accompanying drawings. However, it should be understood that the figures are not drawn to scale. Distances, angles, etc. are merely illustrative and do not necessarily bear an exact relationship to actual dimensions and layout of the devices illustrated. In addition, the foregoing embodiments have been described at a level of detail to allow one of ordinary skill in the art to make and use the devices, systems, methods, etc. described herein. A wide variety of variation is possible. Components, elements, and/or steps may be altered, added, removed, or rearranged.

The devices and methods described herein can advantageously be at least partially implemented using, for example, computer software, hardware, firmware, or any combination of software, hardware, and firmware. Software modules can comprise computer executable code, stored in a computer's memory, for performing the functions described herein. In some embodiments, computer-executable code is executed by one or more general purpose computers. However, a skilled artisan will appreciate, in light of this disclosure, that any module that can be implemented using software to be executed on a general purpose computer can also be implemented using a different combination of hardware, software, or firmware. For example, such a module can be implemented completely in hardware using a combination of integrated circuits. Alternatively or additionally, such a module can be implemented completely or partially using specialized computers designed to perform the particular functions described herein rather than by general purpose computers. In addition, where methods are described that are, or could be, at least in part carried out by computer software, it should be understood that such methods can be provided on non-transitory computer-readable media (e.g., optical disks such as CDs or DVDs, hard disk drives, flash memories, diskettes, or the like) that, when read by a computer or other processing device, cause it to carry out the method.

While certain embodiments have been explicitly described, other embodiments will become apparent to those of ordinary skill in the art based on this disclosure.

What is claimed is:

1. A display system comprising:
   a display configured to display image data, the image data comprising a current image data frame with a plurality of color components;
   a plurality of light sources configured to illuminate the display; and
   a display system controller configured to:
      receive the current image data frame,
      read control information embedded in the current image data frame, the control information comprising an indication to inactivate a selected color component within the current image data frame, and
      control at least a first control input for at least one of the plurality of light sources based on the embedded control information so as to inactivate the selected color component within the current image data frame,
      wherein the embedded control information is inserted into the current image data frame in place of a portion of the image data, and
      wherein the embedded control information further comprises advance frame display information which includes an indication to selectively re-activate the selected color component within a subsequent image data frame.

2. The display system of claim 1, further comprising a plurality of spatial light modulators configured to modulate light from the plurality of light sources with the image data, wherein the display system controller is further configured to control at least a second control input for at least one of the plurality of spatial light modulators based on the embedded control information, wherein the second control input comprises a reduced-power setting for a spatial light modulator corresponding to the selected color component.

3. The display system of claim 2, wherein the second control input comprises a complete power shut-off setting for the spatial light modulator corresponding to the selected color component.

4. The display system of claim 1, wherein the display system controller is configured to control a second control input for at least one of the plurality of light sources based on the advance frame display information embedded in the current image data frame.

5. The display system of claim 4, wherein the second control input comprises an increased-power setting for a light source corresponding to the selected color component.

6. The display system of claim 5, wherein the advance frame display information includes an indication of a timing for implementing the increased-power setting.

7. The display system of claim 6, wherein the timing for implementing the increased-power setting is prior to a timing for displaying the subsequent image data frame.

8. The display system of claim 6, wherein the timing for implementing the increased-power setting is based on a user's motion.

9. The display system of claim 5, wherein the second control input comprises a full power setting for the light source corresponding to the inactivated color component.

10. The display system of claim 9, wherein the advance frame display information includes an indication of a timing for implementing the full power setting.

11. The display system of claim 10, wherein the timing for implementing the full power setting is prior to a timing for displaying the subsequent image data frame.

12. The display system of claim 10, wherein the timing for implementing the increased-power setting is based on a user's motion.

13. The display system of claim 1, wherein the embedded control information comprises one or more substituted values in one or more pixels of the image data.

14. The display system of claim 1, wherein the display system controller is further configured to remove the embedded control information from the current image data frame before the current image data frame is displayed.

15. A method for controlling a display system comprising a display and a plurality of light sources, the method performed by at least one processor of the display system, the method comprising:
   receiving a current image data frame to be presented through the display, the current image data frame including a plurality of color components;
   reading control information embedded in the current image data frame, the control information comprising an indication to inactivate a selected color component within the current image data frame, and
   based on the embedded control information, controlling at least a first control input for at least one of the plurality of light sources that are configured to illuminate the display, wherein the first control input inactivates the selected color component within the current image data frame,
   wherein the embedded control information is inserted into the current image data frame in place of a portion of image data, and
   wherein the embedded control information further comprises advance frame display information which includes an indication to selectively re-activate the selected color component within a subsequent image data frame.

16. The method of claim 15, wherein the display system further comprises a plurality of spatial light modulators configured to modulate light from the plurality of light sources with the image data, and wherein the method further comprises controlling at least a second control input for at least one of the plurality of spatial light modulators based on the embedded control information, wherein the second control input comprises a reduced-power setting for a spatial light modulator corresponding to the selected color component.

17. The method of claim 15, further comprising controlling a second control input for at least one of the plurality of light sources based on the advance frame display information embedded in the current image data frame.

18. The method of claim 15, further comprising removing the embedded control information from the current image data frame before the current image data frame is displayed.

19. A display system comprising:
   a display configured to display image data, the image data comprising a current image data frame with a plurality of color components;
   a plurality of light sources configured to illuminate the display;
   a plurality of spatial light modulators configured to modulate light from the plurality of light sources with the image data; and
   a display system controller configured to:
      receive the current image data frame, read control information embedded in the current image data frame, the control information comprising an indication to inactivate a selected color component within the current image data frame, control at least a first control input for at least one of the plurality of light sources based on the embedded control information so as to inactivate the selected color component within the current image data frame, and control at least a second control input for at least one of the plurality of spatial light modulators based on the embedded control information, wherein the second control input comprises a reduced-power setting for a spatial light modulator corresponding to the selected color component, wherein the second control input comprises a complete power shut-off setting for the spatial light modulator corresponding to the selected color component, and wherein the embedded control information further comprises advance frame display information which includes an indication to selectively re-activate the selected color component within a subsequent image data frame.

20. A method for controlling a display system comprising a display configured to display image data, a plurality of light sources, and a plurality of spatial light modulators configured to modulate light from the plurality of light sources with the image data, the method performed by at least one processor of the display system, the method comprising:

receiving a current image data frame to be presented through the display, the current image data frame including a plurality of color components;

reading control information embedded in the current image data frame, the control information comprising an indication to inactivate a selected color component within the current image data frame, based on the embedded control information, controlling at least a first control input for at least one of the plurality of light sources that are configured to illuminate the display, wherein the first control input inactivates the selected color component within the current image data frame, and based on the embedded control information, controlling at least a second control input for at least one of the plurality of spatial light modulators based on the embedded control information, wherein the second control input comprises a reduced-power setting for a spatial light modulator corresponding to the selected color component, wherein the second control input comprises a complete power shut-off setting for the spatial light modulator corresponding to the selected color component, and wherein the embedded control information further comprises advance frame display information which includes an indication to selectively re-activate the selected color component within a subsequent image data frame.

21. A display system comprising:

a display configured to display image data, the image data comprising a current image data frame with a plurality of color components;

a plurality of light sources configured to illuminate the display; and a display system controller configured to:
receive the current image data frame,
read control information embedded in the current image data frame, the control information comprising an indication to inactivate a selected color component within the current image data frame,
control at least a first control input for at least one of the plurality of light sources based on the embedded control information so as to inactivate the selected color component within the current image data frame, and
remove the embedded control information from the current image data frame before the current image data frame is displayed, wherein the embedded control information further comprises advance frame display information which includes an indication to selectively re-activate the selected color component within a subsequent image data frame.

22. A method for controlling a display system comprising a display and a plurality of light sources, the method performed by at least one processor of the display system, the method comprising:

receiving a current image data frame to be presented through the display, the current image data frame including a plurality of color components;

reading control information embedded in the current image data frame, the control information comprising an indication to inactivate a selected color component within the current image data frame, based on the embedded control information, controlling at least a first control input for at least one of the plurality of light sources that are configured to illuminate the display, wherein the first control input inactivates the selected color component within the current image data frame, and removing the embedded control information from the current image data frame before the current image data frame is displayed, wherein the embedded control information further comprises advance frame display information which includes an indication to selectively re-activate the selected color component within a subsequent image data frame.

* * * * *